US011609586B2

(12) United States Patent
Lawson

(10) Patent No.: US 11,609,586 B2
(45) Date of Patent: Mar. 21, 2023

(54) APPARATUSES FOR FACILITATING RELIEVING PRESSURE IN A FLUID TRANSPORTATION SYSTEM

(71) Applicant: Aaron Dwayne Lawson, Irving, TX (US)

(72) Inventor: Aaron Dwayne Lawson, Irving, TX (US)

( * ) Notice: Subject to any disclaimer, the term of this patent is extended or adjusted under 35 U.S.C. 154(b) by 319 days.

(21) Appl. No.: 17/069,340

(22) Filed: Oct. 13, 2020

(65) Prior Publication Data
US 2021/0223801 A1    Jul. 22, 2021

Related U.S. Application Data

(60) Provisional application No. 62/914,525, filed on Oct. 13, 2019.

(51) Int. Cl.
| | | |
|---|---|---|
| *G05D 16/20* | (2006.01) | |
| *E21B 43/26* | (2006.01) | |
| *G06T 7/00* | (2017.01) | |
| *G01L 19/08* | (2006.01) | |
| *G06F 3/041* | (2006.01) | |
| *H04N 7/18* | (2006.01) | |
| *H04N 5/225* | (2006.01) | |

(52) U.S. Cl.
CPC ....... *G05D 16/202* (2013.01); *E21B 43/2607* (2020.05); *G01L 19/086* (2013.01); *G06T 7/0004* (2013.01); *H04N 7/183* (2013.01); *G06F 3/041* (2013.01); *H04N 5/2253* (2013.01); *Y10T 137/264* (2015.04)

(58) Field of Classification Search
CPC . G05D 16/202; E21B 43/2607; G01L 19/086; G06T 7/0004; H04N 7/183; H04N 5/2253; G06F 3/041; Y10T 137/164
USPC ...................................................... 137/115.25
See application file for complete search history.

(56) References Cited

U.S. PATENT DOCUMENTS

| | | | | |
|---|---|---|---|---|
| 4,394,871 A | * | 7/1983 | Czajka | ............... G05D 16/2053 137/624.11 |
| 6,021,799 A | * | 2/2000 | Price | .................... B05B 7/1472 137/487.5 |
| 6,079,436 A | * | 6/2000 | Delfs | ...................... B60T 17/02 137/115.19 |
| 6,209,566 B1 | * | 4/2001 | Burdock | ............... F15B 21/045 361/160 |
| 8,186,817 B2 | | 5/2012 | Jones et al. | |
| 9,151,731 B2 | * | 10/2015 | Heitz | ................. G01N 33/4925 |

(Continued)

*Primary Examiner* — William M McCalister

(57) ABSTRACT

Disclosed is an apparatus for relieving pressure in a fluid transportation system. Further, the apparatus may include an actuator configured to be mounted onto the handle of the flow control member. Further, the apparatus may include a valve sensor configured to be attached to a pressure relieving valve. Further, the apparatus may include an image capturing device configured to capture an image of a pressure gauge. Further, the apparatus may include a processing device communicatively coupled to the actuator, the valve sensor and the image capturing device. Further, the apparatus may include a storage device communicatively coupled to the processing device. Further, the apparatus may include a wireless transceiver communicatively coupled to the processing device. Further, the apparatus may include a touchscreen display device communicatively coupled to the processing device.

20 Claims, 16 Drawing Sheets

(56) References Cited

U.S. PATENT DOCUMENTS

| | | | |
|---|---|---|---|
| 9,322,243 B2* | 4/2016 | Baca | E21B 34/02 |
| 10,550,665 B1* | 2/2020 | Golden | F16K 31/041 |
| 11,442,478 B2* | 9/2022 | Schulz | G05D 16/2053 |
| 2002/0109115 A1* | 8/2002 | Cederstav | G05D 16/202 |
| | | | 251/129.04 |
| 2003/0099549 A1* | 5/2003 | Shen | F04B 49/08 |
| | | | 417/44.2 |
| 2006/0185731 A1 | 8/2006 | Grable et al. | |
| 2011/0192600 A1* | 8/2011 | Patterson | G05D 7/0635 |
| | | | 166/270 |
| 2011/0284125 A1* | 11/2011 | Hagen | B60K 15/03519 |
| | | | 141/286 |
| 2012/0059313 A1 | 3/2012 | Shergold | |
| 2013/0255787 A1* | 10/2013 | Frank | B60G 17/0523 |
| | | | 137/1 |
| 2014/0048158 A1* | 2/2014 | Baca | E21B 34/02 |
| | | | 137/511 |
| 2014/0332088 A1* | 11/2014 | Senesh | G05D 16/204 |
| | | | 137/115.25 |
| 2016/0037135 A1* | 2/2016 | McSheffrey | H04N 7/183 |
| | | | 348/143 |
| 2017/0003189 A1* | 1/2017 | Bernard | G06K 7/1417 |
| 2017/0335654 A1 | 11/2017 | Olsen et al. | |
| 2018/0173253 A1* | 6/2018 | Schulz | G05D 16/202 |
| 2019/0337026 A1* | 11/2019 | Butterbaugh | B08B 3/02 |
| 2020/0012634 A1* | 1/2020 | Eberhardt | G01M 99/00 |
| 2021/0223801 A1* | 7/2021 | Lawson | E21B 43/2607 |
| 2022/0289391 A1* | 9/2022 | Buck | G05D 16/202 |

* cited by examiner

APPARATUSES FOR FACILITATING RELIEVING PRESSURE IN A FLUID TRANSPORTATION SYSTEM

The current application claims a priority to the U.S. Provisional Patent application Ser. No. 62/914,525 filed on Oct. 13, 2019.

FIELD OF THE INVENTION

Generally, the present disclosure relates to the field fracturing devices. More specifically, the present disclosure relates to apparatuses for facilitating relieving pressure in a fluid transportation system.

BACKGROUND OF THE INVENTION

Significant resources are employed for searching and extracting natural resources like oil, natural gas, etc. Specialized equipment, such a fracking manifold, is used for discovering, drilling and extracting the natural resources. The fracking manifold includes a wide variety of components, such as valves, fluid conduits, and the like. When high pressure fluids, chemicals and sand are pumped into the ground, there is a need to build up a large amount of pressure to test the series of piping to see if it will withstand the desired operating pressure. That pressure may range from 1 k to 20 k or higher.

When building up that much pressure for testing as well as pumping fluid into the ground at high pressures anything can go wrong below ground or above ground, and the operation is stopped due to any issues of pumping fluids into the ground or testing then pressure is trapped in corresponding pumps and piping. When the pressure is trapped in the piping it has to be released in order to solve whatever issues are at hand above or under the ground or to re-test/pressure test.

The standard way pressure is released is manually by hand, using an iron bar, opening the valves slowly until all the pressure is released into an open pit, over the past years and decades there have been many fatalities, injuries and deaths due to iron failure or careless operation.

Therefore, there is a need for improved apparatuses for facilitating relieving pressure in a fluid transportation system that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed is an apparatus for relieving pressure in a fluid transportation system. The fluid transportation system includes a fluid inlet configured to receive fluid, a fluid outlet configured to discharge fluid, a conduit fluidly coupled to each of the fluid inlet and the fluid outlet. Further, the conduit may be configured to transport the fluid from the fluid inlet to the fluid outlet, a pressure gauge configured to indicate a pressure of the fluid in the conduit, and a pressure relieving valve fluidly coupled to the conduit at a location along the conduit. Further, the pressure relieving valve may be configured to relieve pressure in the conduit. Further, the pressure relieving valve may include a valve body comprising a valve inlet fluidly coupled to the conduit, a valve cavity fluidly coupled to the valve inlet, a valve outlet fluidly coupled to the valve cavity, and a flow control member disposed in the valve cavity. Further, the flow control member may be configured to control flow of fluid from the valve inlet to the valve outlet. Further, the flow control member may be configured to be set at one of a plurality of positions in relation to the valve cavity. Further, the plurality of positions may include a fully open position, a partially open position and a fully closed position. Further, the flow control member may include a handle configured to facilitate transitioning of the flow control member from a first position of the plurality of positions to a second position of the plurality of positions. Further, the apparatus may include an actuator configured to be mounted onto the handle of the flow control member. Further, the actuator may be configured to exert a force on the handle based on a command. Further, the apparatus may include a valve sensor configured to be attached to the pressure relieving valve. Further, the valve sensor may be configured to detect a position of the flow control member and generate a valve position data representing the position based on the detection. Further, the apparatus may include an image capturing device configured to capture an image of the pressure gauge. Further, the image capturing device may be configured to be mounted on the fluid transportation system. Further, the apparatus may include a processing device communicatively coupled to the actuator, the valve sensor and the image capturing device. Further, the processing device may be configured to analyze the image. Further, the processing device may be configured to determine the pressure based on the analyzing. Further, the processing device may be configured to comparing the pressure to a predetermined limit. Further, the processing device may be configured to generate the command based on the pressure exceeding the predetermined limit and the valve position data. Further, the apparatus may include a storage device communicatively coupled to the processing device. Further, the storage device may be configured to store the predetermined limit. Further, the apparatus may include a wireless transceiver communicatively coupled to the processing device. Further, the wireless transceiver may be configured to transmit at least one of the image, the valve position data and the command to a remote user device and receive a remote instruction from the remote user device. Further, the processing device may be configured to generate the command based on the remote instruction independent of the comparing. Further, the apparatus may include a touchscreen display device communicatively coupled to the processing device. Further, the touchscreen display device may be configured to display at least one of the image, the pressure, the valve position data, the command and the remote instruction. Further, the touchscreen display device may be configured to receive a touch input corresponding to the pressure relieving valve. Further, the processing device may be configured to generate the command based on the touch input independent of the pressure of the fluid in the conduit.

According to some embodiments, a fluid transportation system configured for relieving pressure is disclosed. Further, the fluid transportation system may include a fluid inlet configured to receive fluid. Further, the fluid transportation system may include a fluid outlet configured to discharge fluid. Further, the fluid transportation system may include a conduit fluidly coupled to each of the fluid inlet and the fluid outlet. Further, the conduit may be configured to transport the fluid from the fluid inlet to the fluid outlet. Further, the fluid transportation system may include a pressure gauge fluidly coupled to the conduit. Further, the pressure gauge may be configured to indicate a pressure of the fluid in the conduit. Further, the fluid transportation system may include a pressure relieving valve fluidly coupled to the conduit. Further, the pressure relieving valve may be configured to relieve pressure in the conduit. Further, the pressure relieving valve may include a valve body may include a valve inlet fluidly coupled to the conduit. Further, the pressure relieving valve may include a valve cavity fluidly coupled to the valve inlet. Further, the pressure relieving valve may include a valve outlet fluidly coupled to the valve cavity. Further, the pressure relieving valve may include a flow control member disposed in the valve cavity. Further, the flow control member may be configured to control flow of fluid from the valve inlet to the valve outlet. Further, the flow control member may be configured to be set at one of a plurality of positions in relation to the valve cavity. Further, the plurality of positions may include an open position and a closed position. Further, the flow control member further may include a handle configured to facilitate transitioning of the flow control member from a first position of the plurality of positions to a second position of the plurality of positions. Further, the fluid transportation system may include an actuator attached to the handle of the flow control member. Further, the actuator may be configured to exert a force on the handle based on a command. Further, the fluid transportation system may include a valve sensor attached to the pressure relieving valve. Further, the valve sensor may be configured to detect a position of the flow control member and generate a valve position data representing the position. Further, the fluid transportation system may include an image capturing device configured to capture an image of the pressure gauge. Further, the fluid transportation system may include a processing device communicatively coupled to the actuator, the valve sensor and the image capturing device. Further, the processing device may be configured to analyze the image. Further, the processing device may be configured to determine the pressure based on the analyzing. Further, the processing device may be configured to compare the pressure to a predetermined limit. Further, the processing device may be configured to generate the command based on the pressure exceeding the predetermined limit and the valve position data. Further, the fluid transportation system may include a storage device communicatively coupled to the processing device. Further, the storage device may be configured to store the predetermined limit. Further, the fluid transportation system may include a wireless transceiver communicatively coupled to the processing device. Further, the wireless transceiver may be configured to transmit at least one of the image, the valve position data and the command to a remote user device and receive a remote instruction from the remote user device. Further, the processing device may be configured to generate the command based on the remote instruction independent of the comparing. Further, the fluid transportation system may include a touchscreen display device communicatively coupled to the processing device. Further, the touchscreen display device may be configured to display at least one of the image, the pressure, the valve position data, the command and the remote instruction. Further, the touchscreen display device may be configured to receive a touch input corresponding to the pressure relieving valve. Further, the processing device may be configured to generate the command based on the touch input independent of the pressure of the fluid in the conduit.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
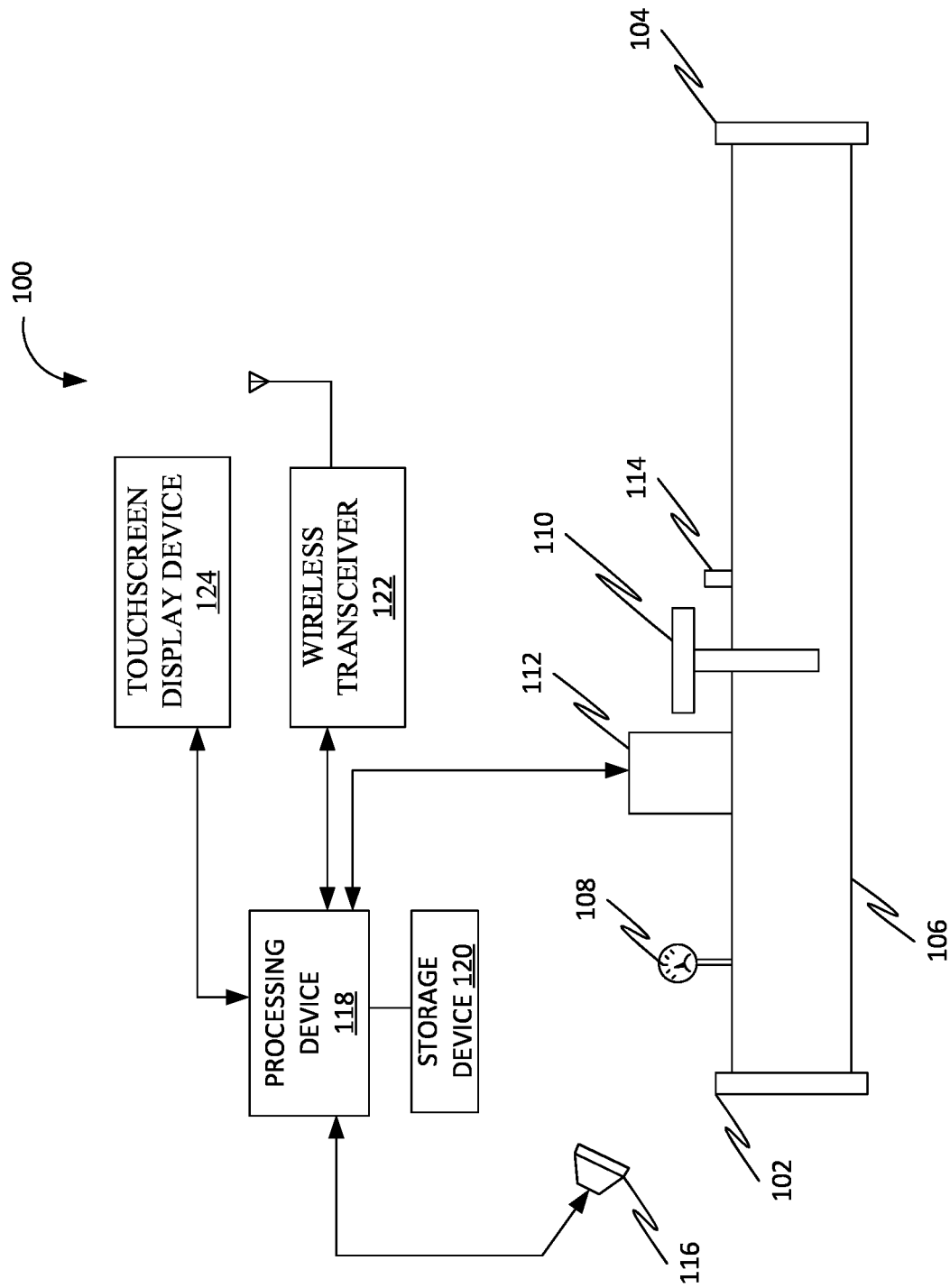
FIG. 1 is a schematic of an apparatus for relieving pressure in a fluid transportation system, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of apparatuses for facilitating relieving pressure in a fluid transportation system, embodiments of the present disclosure are not limited to use only in this context.

Overview:

According to some embodiments, a manifold for relieving pressure in a fluid transportation system is disclosed. Further, valves (on the manifold) may be operated automatically or manually just in case any failure from the automated PLC system is experienced.

Further, the disclosed manifold may allow operators to interchange the ULT Hydraulic Plug valves for different job applications in a variety ranging from pneumatic to hydraulic to electrical.

Further, the disclosed manifold may be controlled and operated from a via remote location whether it's on a job location or at a business office. It also can be viewed from anywhere due to the local wireless camera system.

Also, the manifold may include a camera setup and 4 monitors to display the transition of the valve that's being operated and state of position the valve is in, to eliminate any operator from confusion of what's going on and where the operator is in the process of building pressure and fluid or releasing it. Also the monitors may display the current pressure that's being built up or being released as it's released or the pressure that's trapped in the pipes leading to the manifold piping and valves.

Further, the manifold may be designed for easy assembly for changing out parts as well as being a bit compact to fit on any size job location, all the way to loading and unloading it for transportation from job sites to warehouses.

Further, the manifold may allow for safe operation when it comes to operating valves under high pressure in an environment that requires high pressure.

Further, the manifold may be designed/assembled by replacing original forms and layouts of piping and plug valves and restructured them. They may be replaced and restructured with Single and Dual Body ULT Hydraulic Plug Valves, Manual Operated Dual Body ULT Plug Valves, a API 6A Check Valve and studded API 6A Crosses and Tee's, API 6A studded 90's and API 6A weco adapter unions and hammer unions. They may be mounted to a custom designed skid also with a custom designed camera pole mount with 4 monitors with a camera centered over the top of the monitors. Also mounted is a custom designed junction box for input and output terminations for the proximity sensors and pressure transducers as well as the camera and monitors that runs back to the Data Acquisition Box. Also there is a 12 port quick disconnect hydraulic valve bank for hydraulic hoses to be connected.

Further, the ULT Hydraulic Plug Valves may be modified by adding a mounted Proximity Sensor on top outer rim of the valves and a 3 position notch coupling to the stem of the top center of the plug valve that moves when the internals of the valve move. This may allow operators to recognize what position the valve is in by the information provided on the SCADA program. The information may be read from the proximity sensor which picks up a signal from the 3 position notch coupling and can be determined by a visual look by looking at the 3 position notch coupling that's modified to fit on the stem on top of the ULT Hydraulic Plug Valve.

According to some embodiments, the disclosed manifold may be designed to go on any Oil and Gas job site, but it's primarily designed to go on fracturing job sites.

According to some embodiments, an Automated Bleed-Off Manifold with Hydraulic Actuated Plug Valves is disclosed. The plug valves may be operated by an Automated PLC System, so that the valves can be operated afar from high pressure avoiding any injuries or fatalities. The valves also can be operated manually in case any automated malfunction takes place.

Further, the Automated Bleed-off Manifold may be operated remotely from a laptop or tablet Connected by Ethernet or from the local HMI at the PLC control cabinet.

There may be a total of 6 hydraulic actuated plug valves in a Dual body form that may be operated by a PLC automated system.

An operator may select the desired Hydraulic Actuated Plug Valve on the SCADA program on screen.

Further, the operator may select whether they want to open the valve to a fully open position or halfway or the close position. After selection, the desired valve and the halfway open position the SCADA program sends a command to the Automated PLC system.

Once the PLC system receives the command, the PLC program sends a signal to the control box on the Hydraulic power pack, then a signal is sent to the hydraulic pump to start and then a signal is sent to the hydraulic directional valve on the hydraulic power pack that's associated with the desired plug valve that was selected on the SCADA program.

Then the directional valve will receive signal on the supply side and open and allow hydraulic fluid to flow since the valve was selected to open halfway.

The hydraulic fluid will flow through a high pressure hydraulic hose from the directional valve to the manifold through a joint quick disconnect connection on the manifold, and through there to the supply side on the hydraulic actuator on the plug valve that was selected.

The hydraulic actuator is supplied hydraulic fluid to its supply side and will flow out the return side back to the hydraulic power pack, and the valve will turn until the custom mounted "magnetic sensor" that's mounted on the top outer rim of the hydraulic actuator receives a magnetic signal.

It will receive a magnetic signal from a custom made coupling that has three notches on it, and that coupling is fastened by a set screw to the open and close indication stem at the top of the Hydraulic actuator which connects to the internals of the valve.

The coupling will turn with the valve as the hydraulic fluid is supplied to the actuator, and the second notch on the coupling will pass in front of the sensor causing a magnetic signal and that signal will pass through the magnetic sensor to a local custom junction box that's mounted to the manifold. From there the signal will immediately go back to the automated PLC system and notify the PLC program to end.

If operator wants to fully open the valve then the operator would select that valve on the Laptop or local HMI and select fully open and that process will repeat once again, and the valve will be open all the way one the process is finished.

The same actions will be taken if the operator wants to close the valve or valves.

Alternate manual valves: There are 4 standard Dual Body Manual Valves that's parallel with the Dual Body Hydraulic Actuated Valves that can be operated manually by using a Iron Line Bar or Pry Bar, to open and release pressure or close after releasing pressure from the valves just in case the Automated PLC System fails for any reason.

Valves assignment: One set of Dual Body Manual Plug Valves and one set of Dual Body Hydraulic Actuated Plug Valves are parallel to release pressure on the "Pumpside" (the side that the pressure is being built on), the operator may release it automatically or manually by hand if any issues are at hand.

The other set of Dual Body Manual Plug Valves and Dual Body Hydraulic Actuated Plug Valves are parallel to release pressure on the "Wellside" (the side where fluid is pumped in the ground), if pressure over exceed underground or in the piping that's going into the ground, the operator may release it automatically or manually by hand if any issues are at hand.

There are two other single Hydraulic Actuated plug valves:

One is directly inline with the direction of flow of pressurized fluid from the pumps to the well in-ground. That valve is controlled Automatically and it isolates the Wellside Pressurized fluid from the Pumpside pressurized fluid.

The other Hydraulic Actuated Plug Valve is located inline with the direction of flow of pressurized fluid at the connection of the pump piping to the manifold, and the operator may connect anything to it for many different purposes like adding on pipes all the way to gauges and pressure transducers and burst disks.

All these valves may be used to direct or restrict the flow of pressurized fluid.

Additional components to the manifold:

There are two Pressure Transducers located inline with the single on the Manifold piping on the main line of flow from the pumps to the well in-ground.

One pressure transducer is located on the Wellside of the single Hydraulic Actuated Plug Valve to read operating Wellside pressure.

The other pressure transducer is located on the other side of the single Hydraulic Actuated Plug Valve to read operating Pumpside pressure.

Camera and monitors: The monitors are for working personnel to see operating pressure and transition of valve operation. The camera is to see working operation of valves from remote location or afar on job site via tablet or laptop.

According to some embodiments, an Automated Bleed-Off Manifold with Hydraulic Actuated Plug Valves is disclosed. An operator may use a remote HMI that controls an automated PLC system. The manifold may include an automated PLC system with local HMI that controls hydraulic power pack. Further, the hydraulic power pack may operate the valves on the manifold. When pressure is trapped on either side or need to be released on with side then the hydraulic actuated valves will be operated to release fluid out to a disposable location.

Referring to figures, FIG. 1 is a schematic of an apparatus 100 for relieving pressure in a fluid transportation system, in accordance with some embodiments. The fluid transportation system includes a fluid inlet 102 configured to receive fluid, a fluid outlet 104 configured to discharge fluid, a conduit 106 fluidly coupled to each of the fluid inlet 102 and the fluid outlet 104. Further, the conduit 106 may be configured to transport the fluid from the fluid inlet 102 to the fluid outlet 104.

Further, the fluid transportation system may include a pressure gauge 108 configured to indicate a pressure of the fluid in the conduit 106.

Further, the fluid transportation system may include a pressure relieving valve 110 fluidly coupled to the conduit 106 at a location along the conduit 106. Further, the pressure relieving valve 110 may be configured to relieve pressure in the conduit 106. Further, the pressure relieving valve 110 may include a valve body comprising a valve inlet fluidly coupled to the conduit 106, a valve cavity fluidly coupled to the valve inlet, a valve outlet fluidly coupled to the valve cavity, and a flow control member disposed in the valve cavity. Further, the flow control member may be configured to control flow of fluid from the valve inlet to the valve outlet. Further, the flow control member may be configured to be set at one of a plurality of positions in relation to the valve cavity. Further, the plurality of positions may include a fully open position, a partially open position and a fully closed position. Further, the flow control member may include a handle configured to facilitate transitioning of the flow control member from a first position of the plurality of positions to a second position of the plurality of positions.

In some embodiments, the pressure relieving valve 110 may include a plug valve.

Further, the apparatus 100 may include an actuator 112 configured to be mounted onto the handle of the flow control member. Further, the actuator 112 may be configured to exert a force on the handle based on a command. Accordingly, the apparatus 100 may be retrofitted to existing fluid transportation systems that may not include inbuilt actuated valves.

In some embodiments, the actuator 112 may be configured to allow free movement of the handle based on a manually applied force to the handle independent of the command.

Further, the apparatus 100 may include a valve sensor 114 configured to be attached to the pressure relieving valve 110. Further, the valve sensor 114 may be configured to detect a position of the flow control member and generate a valve position data representing the position based on the detection.

Further, the apparatus 100 may include an image capturing device 116 configured to capture an image of the pressure gauge 108. Further, the image capturing device 116 may be configured to be mounted on the fluid transportation system.

Further, the apparatus 100 may include a processing device 118 communicatively coupled to the actuator 112, the valve sensor 114 and the image capturing device 116. Further, the processing device 118 may be configured to analyze the image. Further, the processing device 118 may be configured to determine the pressure based on the analyzing. Further, the processing device 118 may be configured to comparing the pressure to a predetermined limit. Further, the processing device 118 may be configured to generate the command based on the pressure exceeding the predetermined limit and the valve position data.

Further, the apparatus 100 may include a storage device 120 communicatively coupled to the processing device 118. Further, the storage device 120 may be configured to store the predetermined limit.

Further, the apparatus 100 may include a wireless transceiver 122 communicatively coupled to the processing device 118. Further, the wireless transceiver 122 may be configured to transmit at least one of the image, the valve position data and the command to a remote user device and receive a remote instruction from the remote user device. Further, the processing device 118 may be configured to generate the command based on the remote instruction independent of the comparing.

Further, the apparatus 100 may include a touchscreen display device 124 communicatively coupled to the processing device 118. Further, the touchscreen display device 124 may be configured to display at least one of the image, the pressure, the valve position data, the command and the remote instruction. Further, the touchscreen display device 124 may be configured to receive a touch input corresponding to the pressure relieving valve 110. Further, the processing device 118 may be configured to generate the command based on the touch input independent of the pressure of the fluid in the conduit 106.

According to some embodiments, the actuator 112 may include a hydraulic actuator. Further, the hydraulic actuator may include an actuator fluid reservoir comprising an incompressible fluid.

Further, the hydraulic actuator may include a pump fluidly coupled to the actuator fluid reservoir. Further, the pump may be configured to pump the actuator fluid. The pumping of the fluid may include injecting the fluid into the interior space and/or sucking the fluid away from the interior space and back into the fluid reservoir.

Further, the hydraulic actuator may include a powered machine operationally coupled to the pump. Further, the powered machine may provide mechanical power to the pump based on at least one of electrical energy and fuel combustion.

Further, the hydraulic actuator may include a cylindrical body comprising a first end cap and a second end cap and an interior space formed therebetween. Further, the cylindrical body may be fluidly coupled to the pump.

Further, the hydraulic actuator may include a piston disposed within the interior space. Further, the piston may be displaceable along a length of the interior space based on the actuator fluid being pumped into a portion of the interior space between an end cap and a side of the piston, wherein the end cap is at least one of the first end cap and the second end cap.

Further, the hydraulic actuator may include a piston rod connected to the piston, wherein the piston rod is operationally coupled to the handle.

Further, the flow control member may be configured to be set at one of the plurality of positions based on a rotatory movement of the handle. Further, the hydraulic actuator may include a rack and pinion gear operatively coupled to each of the piston rod and the handle. Further, the rack and pinion gear may be configured to convert a translatory movement of the piston rod into the rotatory movement of the handle.

Figure 2:
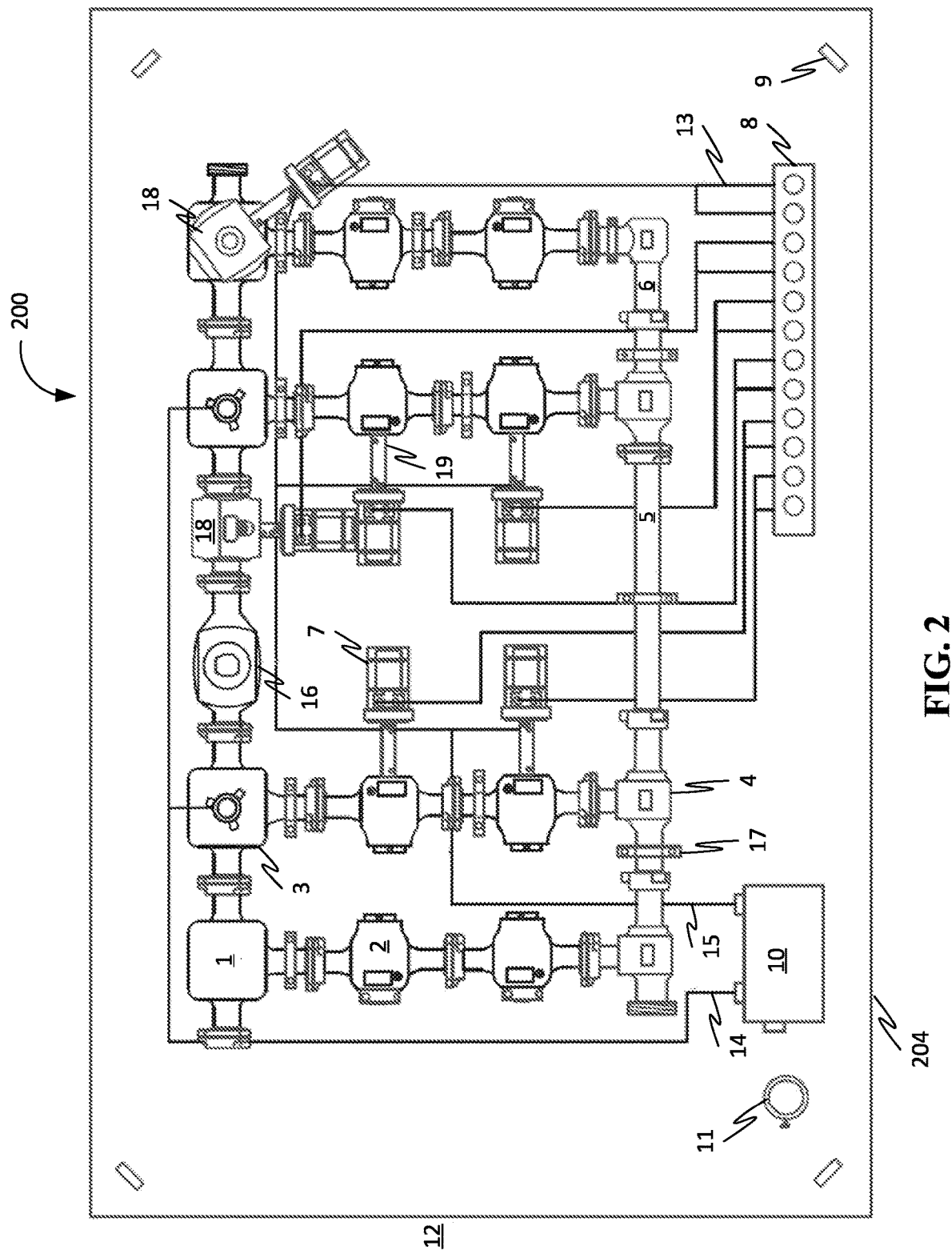
FIG. 2 is a schematic of an apparatus comprising a hydraulic actuator, in accordance with exemplary embodiments.
Figure 3:
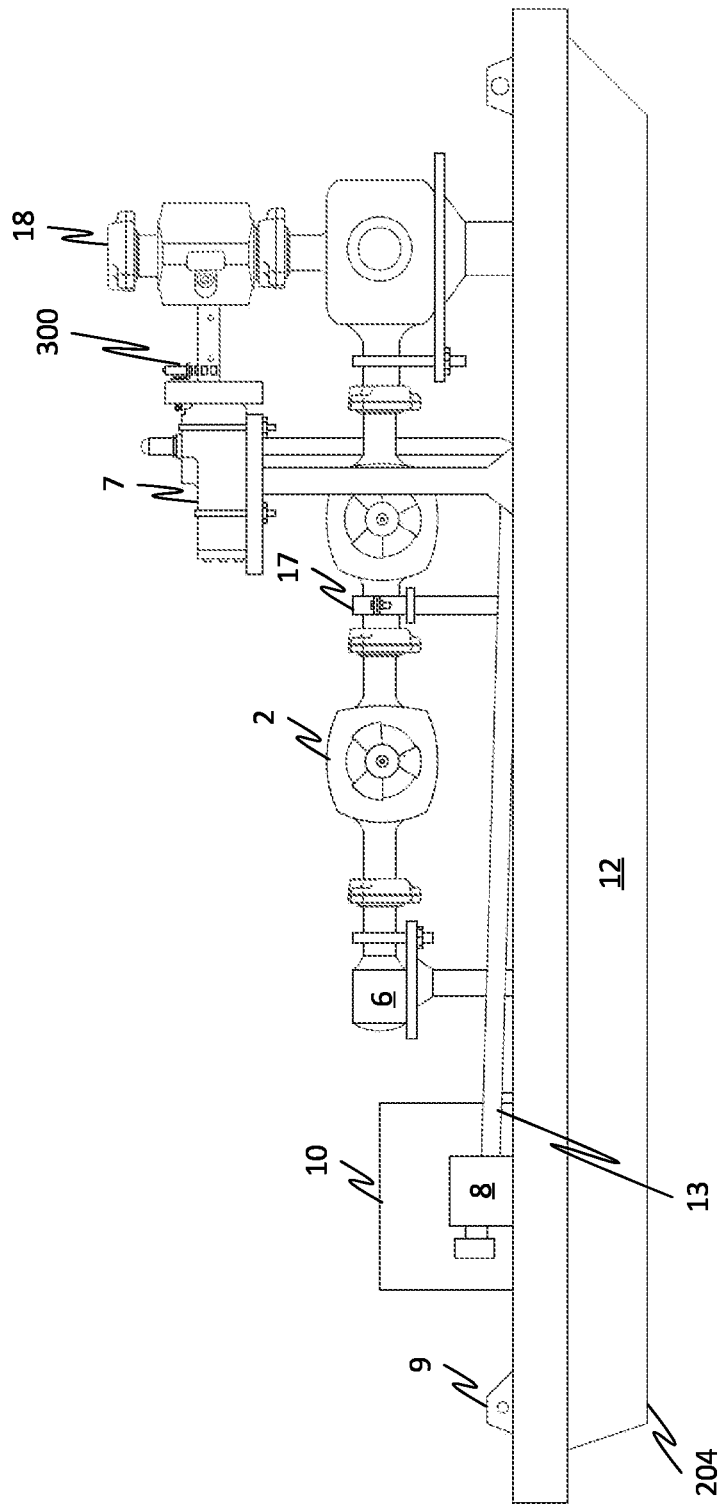
FIG. 3 is a schematic of a side view of the apparatus, in accordance with exemplary embodiments.

FIG. 2 is a schematic of an apparatus 200 comprising a hydraulic actuator (7), in accordance with exemplary embodiments. FIG. 3 is a schematic of a side view of the apparatus 200, in accordance with exemplary embodiments.

The apparatus 200 may be configured for relieving pressure in a fluid transportation system. The fluid transportation system may include a fluid inlet configured to receive fluid, a fluid outlet configured to discharge fluid, a conduit fluidly coupled to each of the fluid inlet and the fluid outlet, a pressure gauge configured to indicate a pressure of the fluid in the conduit, and a pressure relieving valve fluidly coupled to the conduit at a location along the conduit. Further, the pressure relieving valve may be configured to relieve pressure in the conduit. Further, the pressure relieving valve may include a valve body comprising a valve inlet fluidly coupled to the conduit, a valve cavity fluidly coupled to the valve inlet, a valve outlet fluidly coupled to the valve cavity, and a flow control member disposed in the valve cavity. Further, the flow control member may be configured to control flow of fluid from the valve inlet to the valve outlet. Further, the flow control member may be configured to be set at one of a plurality of positions in relation to the valve cavity. Further, the plurality of positions may include a fully open position, a partially open position and a fully closed position. Further, the flow control member further may include a handle configured to facilitate transitioning of the flow control member from a first position of the plurality of positions to a second position of the plurality of positions.

Further, the apparatus 200 may include an actuator (such as a hydraulic motor 7) configured to be mounted onto the handle of the flow control member. Further, the actuator may be configured to exert a force on the handle based on a command. Further, the apparatus 200 may include a valve sensor 300 configured to be attached to the pressure relieving valve. Further, the valve sensor may be configured to detect a position of the flow control member and generate a valve position data representing the position based on the detection. Further, the apparatus 200 may include an image capturing device configured to capture an image of the pressure gauge. Further, the image capturing device may be configured to be mounted on the fluid transportation system. Further, the apparatus 200 may include a processing device communicatively coupled to the actuator, the valve sensor and the image capturing device. Further, the apparatus 200 may include a storage device communicatively coupled to the processing device. Further, the storage device may be configured to store the predetermined limit. Further, the apparatus 200 may include a wireless transceiver communicatively coupled to the processing device. Further, the wireless transceiver may be configured to transmit at least one of the image, the valve position data and the command to a remote user device and receive a remote instruction from the remote user device. Further, the apparatus 200 may include a touchscreen display device communicatively coupled to the processing device.

Further, the apparatus 200 may include one or more of 3" API 6A Tee (1) with hammer and thread unions, 2" Weco ULT plug valves (2), API 6A (3) crosses with hammer and thread unions, 3" Tee (4) with weco thread unions, 4 ft 3" Pup Joint (5), 3" 90-degree elbow (6) with hammer and threaded union, hydraulic motor (7) and mount stands with 1½ inch bolted L-bracket and U-Bolts with mounted metal head all metal sensing proximity sensors with IO-Link, 12 port mounted bracket (8) for hydraulic hoses with quick disconnects, lifting anchors (9), electronic junction box (10), Pole mount (11), Iron skid (12) with 4 lifting anchors, High pressure Hydraulic hoses (13) with high flow male and female quick couplings, mating jupiter connector cables (14) with 4 conductor silicone jackets, for viatran transmitters, M12 sensor cable (15) female to straight connection, 3" Weco top entry check valve (16), Iron pole (17) mounted double bolted clamps, 3" ULT Plug Valves (18) without plug caps, Iron shafts (19) with two set screws and three attached positioning notches.

Figure 4:
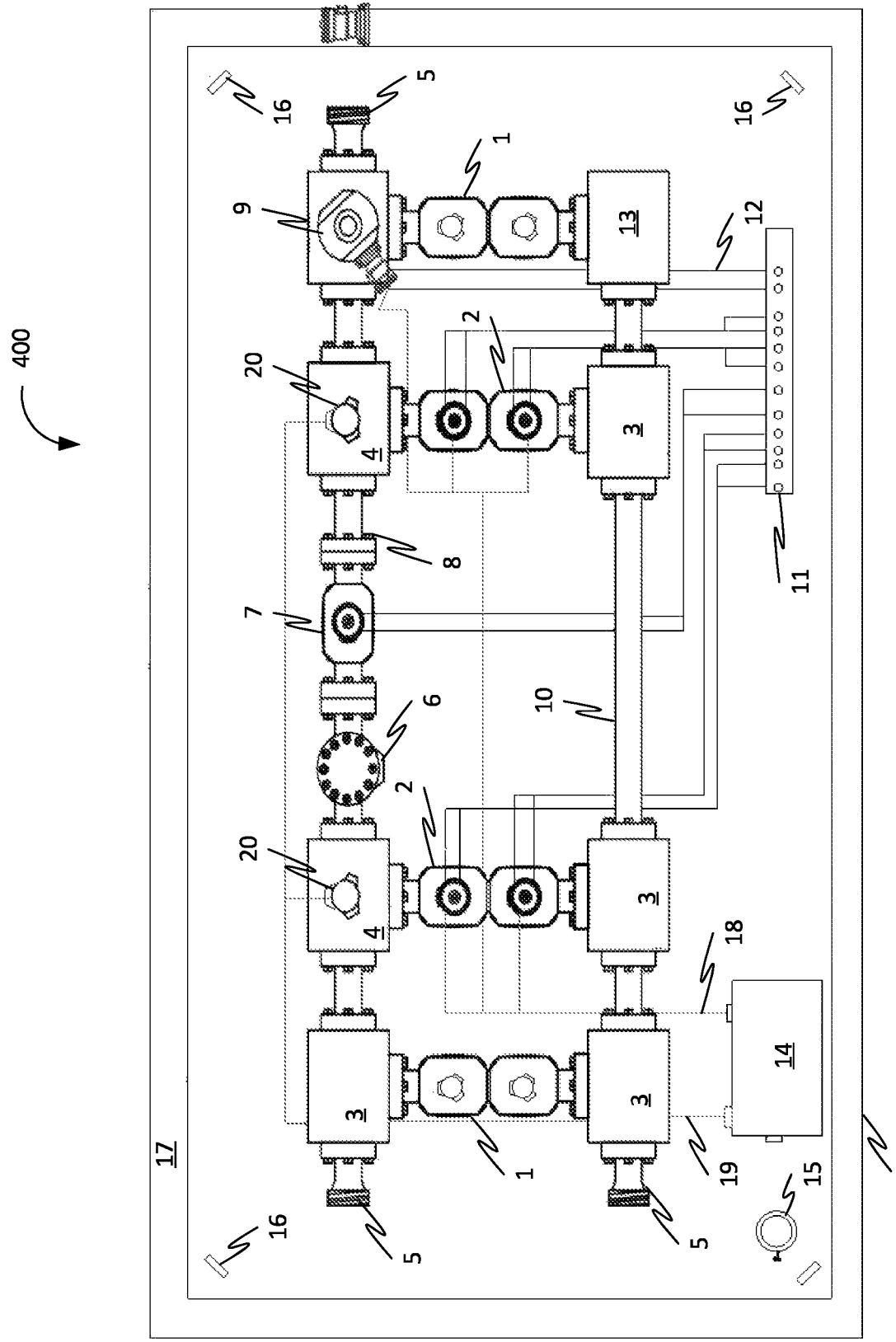
FIG. 4 is a schematic of an apparatus comprising a hydraulic actuator, in accordance with exemplary embodiments.

FIG. 4 is a schematic of an apparatus 400 comprising a hydraulic actuator (7), in accordance with exemplary embodiments. The apparatus 400 may be configured for relieving pressure in a fluid transportation system. The fluid transportation system may include a fluid inlet configured to receive fluid, a fluid outlet configured to discharge fluid, a conduit fluidly coupled to each of the fluid inlet and the fluid outlet, a pressure gauge configured to indicate a pressure of the fluid in the conduit, and a pressure relieving valve fluidly coupled to the conduit at a location along the conduit. Further, the pressure relieving valve may be configured to relieve pressure in the conduit. Further, the pressure relieving valve may include a valve body comprising a valve inlet fluidly coupled to the conduit, a valve cavity fluidly coupled to the valve inlet, a valve outlet fluidly coupled to the valve cavity, and a flow control member disposed in the valve cavity. Further, the flow control member may be configured to control flow of fluid from the valve inlet to the valve outlet. Further, the flow control member may be configured to be set at one of a plurality of positions in relation to the valve cavity. Further, the plurality of positions may include a fully open position, a partially open position and a fully closed position. Further, the flow control member further may include a handle configured to facilitate transitioning of the flow control member from a first position of the plurality of positions to a second position of the plurality of positions.

Further, the apparatus 400 may include the hydraulic actuator configured to be mounted onto the handle of the flow control member. Further, the hydraulic actuator may be configured to exert a force on the handle based on a command. Further, the apparatus 400 may include a valve sensor configured to be attached to the pressure relieving valve. Further, the valve sensor may be configured to detect a position of the flow control member and generate a valve position data representing the position based on the detection. Further, the apparatus 400 may include an image capturing device configured to capture an image of the pressure gauge. Further, the image capturing device may be configured to be mounted on the fluid transportation system. Further, the apparatus 400 may include a processing device communicatively coupled to the hydraulic actuator, the valve sensor and the image capturing device. Further, the apparatus 400 may include a storage device communicatively coupled to the processing device. Further, the storage device may be configured to store the predetermined limit. Further, the apparatus 400 may include a wireless transceiver communicatively coupled to the processing device. Further, the wireless transceiver may be configured to transmit at least one of the image, the valve position data and the command to a remote user device and receive a remote instruction from the remote user device. Further, the apparatus 400 may include a touchscreen display device communicatively coupled to the processing device.

Further, the apparatus 400 may include one or more of Manual ULT Dual body Plug Valves (1) with flanged end connections, ULT Dual Body Hydraulic Actuated Plug Valves (2) with flanged end connections, 3-way API 6A (3) studded Tee's, 3" flow, 15K pressure rated, 4-way API 6A (4) studded crosses with 3" flow, 15K pressure rating, API 6A Weco union Adapter (5) with flange end connection, API 6A Check Valve (6) with flange end connection, Single ULT Hydraulic Actuated Plug Valve (7) with flanged end connections, 1 ft API 6A spacer spools (8) with flange connections, Single ULT Hydraulic Actuated Plug Valves (9) with flanged end connections, 4 ft API 6A spacer spool (10) with flange connection, 12 port mounted bracket (11) for hydraulic hoses quick disconnects, high pressure hydraulic hoses (12) with male and female quick disconnect couplings, API 6A 90 degree studded elbow (13), electronic junction box (14), pole mount (15), lifting anchors (16), Iron Skid (17) with 4 lifting anchors, with a pole mounted slot with a set screw, M12 sensor cables (18) female to straight connection and metal head all metal sensing proximity sensor with IO-Link, mating jupiter connector cables (19) with 4-conductors with silicone jacketed, for viatran transmitters and 15,000 PSI Viatran Pressure Transmitter (20) with 2" 1502 Weco hammer wing union.

According to some embodiments, the apparatus 100 may include a pneumatic actuator. The pneumatic actuator may include an air compressor configured to pump air. Further, pumping of air may include injecting air into the interior space and/or sucking air away from the interior space.

Further, the pneumatic actuator may include a powered machine operationally coupled to the air compressor. Further, the powered machine provides mechanical power to the air compressor based on at least one of electrical energy and fuel combustion.

Further, the pneumatic actuator may include a cylindrical body fluidly coupled to the air compressor. Further, the cylindrical body comprises a first end cap and a second end cap and an interior space formed therebetween.

Further, the pneumatic actuator may include a piston disposed within the interior space. Further, the piston may be displaceable along a length of the interior space based on air pressure in a portion of the interior space between an end cap and a side of the piston. Further, the end cap may be at least one of the first end cap and the second end cap.

Further, the pneumatic actuator may include a piston rod connected to the piston. Further, the piston rod may be operationally coupled to the handle.

Further the flow control member may be configured to be set at one of the plurality of positions based on a rotatory movement of the handle. Further, the pneumatic actuator further may include a rack and pinion gear operatively coupled to each of the piston rod and the handle. Further, the rack and pinion gear may be configured to convert a translatory movement of the piston rod into the rotatory movement of the handle.

Figure 5:
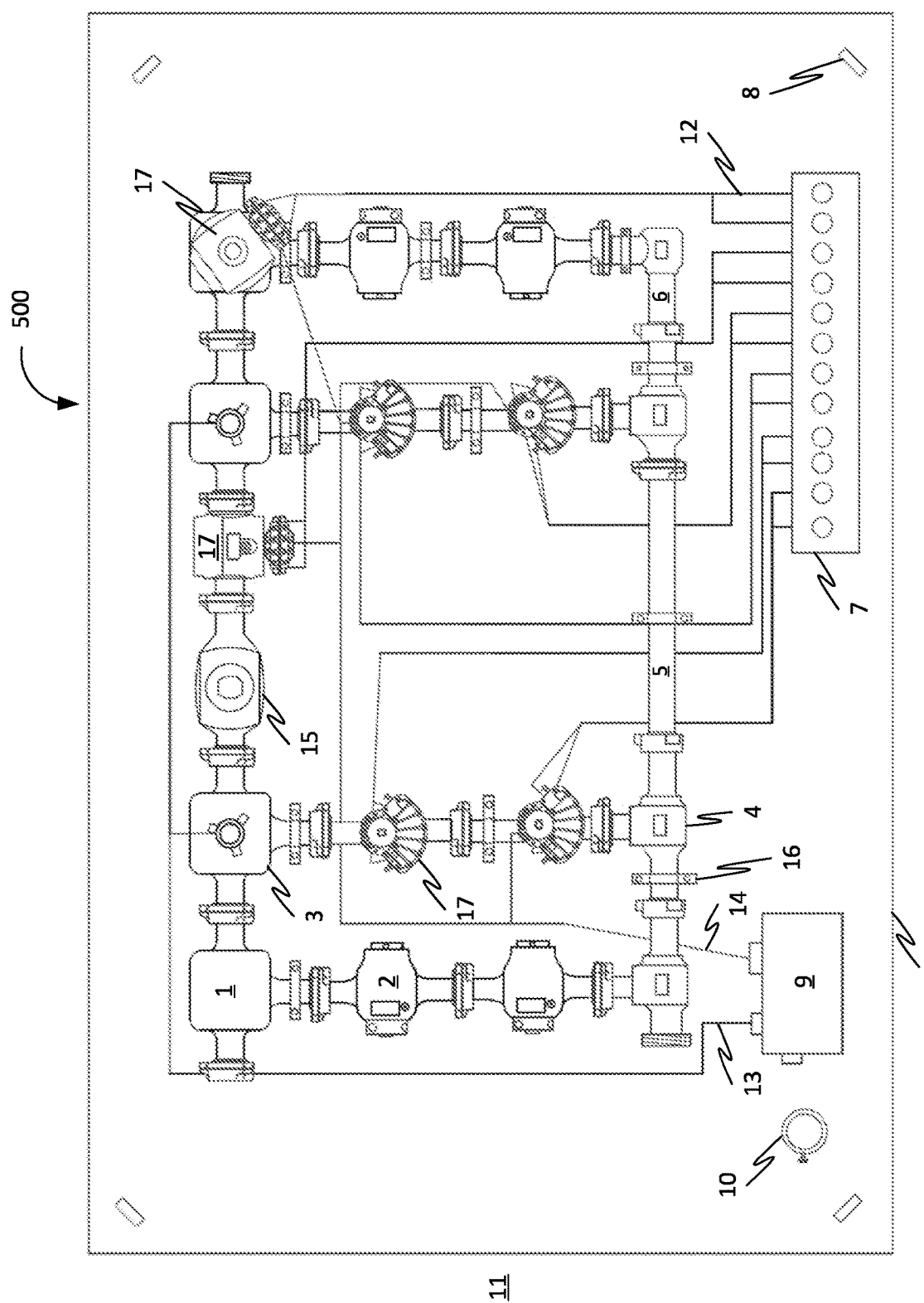
FIG. 5 is a schematic of an apparatus comprising a pneumatic actuator, in accordance with exemplary embodiments.
Figure 6:
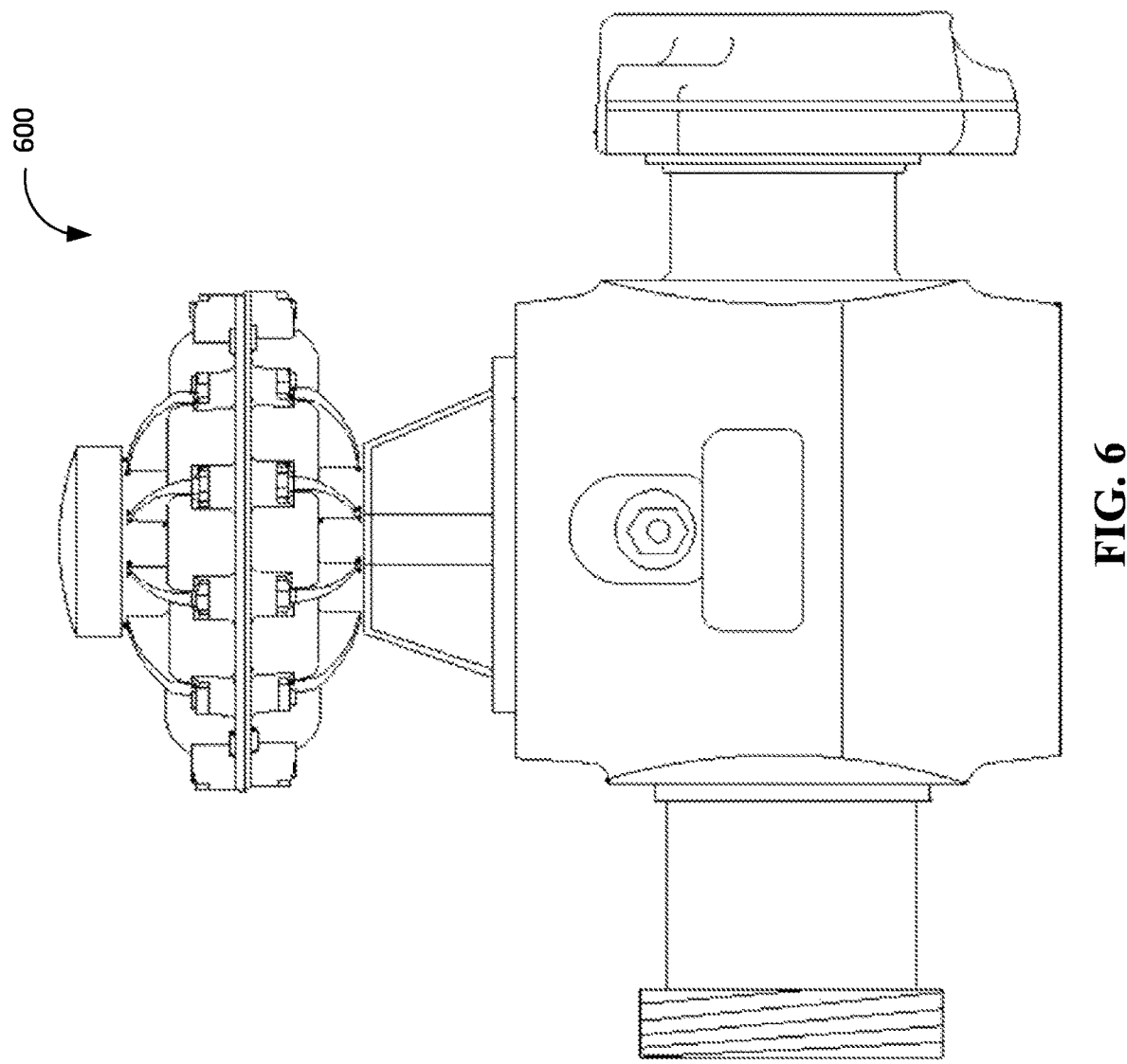
FIG. 6 is a side view of a Pneumatic Plug Valve, in accordance with some embodiments.

FIG. 5 is a schematic of an apparatus 500 comprising a pneumatic actuator (17), in accordance with exemplary embodiments. FIG. 6 is a side view of a Pneumatic Plug Valve 600, in accordance with some embodiments.

The apparatus 500 may be configured for relieving pressure in a fluid transportation system. The fluid transportation system may include a fluid inlet configured to receive fluid, a fluid outlet configured to discharge fluid, a conduit fluidly coupled to each of the fluid inlet and the fluid outlet, a pressure gauge configured to indicate a pressure of the fluid in the conduit, and a pressure relieving valve fluidly coupled to the conduit at a location along the conduit. Further, the pressure relieving valve may be configured to relieve pressure in the conduit. Further, the pressure relieving valve may include a valve body comprising a valve inlet fluidly coupled to the conduit, a valve cavity fluidly coupled to the valve inlet, a valve outlet fluidly coupled to the valve cavity, and a flow control member disposed in the valve cavity. Further, the flow control member may be configured to control flow of fluid from the valve inlet to the valve outlet. Further, the flow control member may be configured to be set at one of a plurality of positions in relation to the valve cavity. Further, the plurality of positions may include a fully open position, a partially open position and a fully closed position. Further, the flow control member further may include a handle configured to facilitate transitioning of the flow control member from a first position of the plurality of positions to a second position of the plurality of positions.

Further, the apparatus 500 may include an actuator configured to be mounted onto the handle of the flow control member. Further, the actuator may be configured to exert a force on the handle based on a command. Further, the apparatus 500 may include a valve sensor configured to be attached to the pressure relieving valve. Further, the valve sensor may be configured to detect a position of the flow control member and generate a valve position data representing the position based on the detection. Further, the apparatus 500 may include an image capturing device configured to capture an image of the pressure gauge. Further, the image capturing device may be configured to be mounted on the fluid transportation system. Further, the apparatus 500 may include a processing device communicatively coupled to the actuator, the valve sensor and the image capturing device. Further, the apparatus 500 may include a storage device communicatively coupled to the processing device. Further, the storage device may be configured to store the predetermined limit. Further, the apparatus 500 may include a wireless transceiver communicatively coupled to the processing device. Further, the wireless transceiver may be configured to transmit at least one of the image, the valve position data and the command to a remote user device and receive a remote instruction from the remote user device. Further, the apparatus 500 may include a touchscreen display device communicatively coupled to the processing device.

Further, the apparatus 500 may include one or more of 3" API 6A Tee (1) with hammer and thread unions, 2" Weco ULT plug valves (2), API 6A crosses with hammer and thread unions (3), 3" Tee (4) with weco thread unions, 4 ft 3" Pup Joint (5), 3" 90 degree elbow (6) with hammer and threaded union, 12 port mounted bracket (7) for pneumatic quick disconnect fittings, lifting anchors (8), electronic junction box (9), Pole mount (10), Iron skid (11) with 4 lifting anchors and pole mount, High pressure pneumatic hoses (12) with high flow pneumatic male and female quick couplings, mating jupiter connector cables (13) with 4 conductor silicone jackets, for viatran transmitters, power control cables (14), 3" Weco top entry check valve (15), Iron pole mounted double bolted clamps (16), 3" Pneumatic ULT Plug Valves with bracket mounted P3 on/off positioner air actuator (17) and 2" Pneumatic ULT Plug Valves with bracket mounted P3 on/off positioner air actuator (18).

According to some embodiments, the actuator 112 may include an electric actuator comprising an electric motor configured to generate rotatory motion on a shaft comprised in the electric motor. Further, the shaft may be operationally coupled to the handle.

Figure 7:
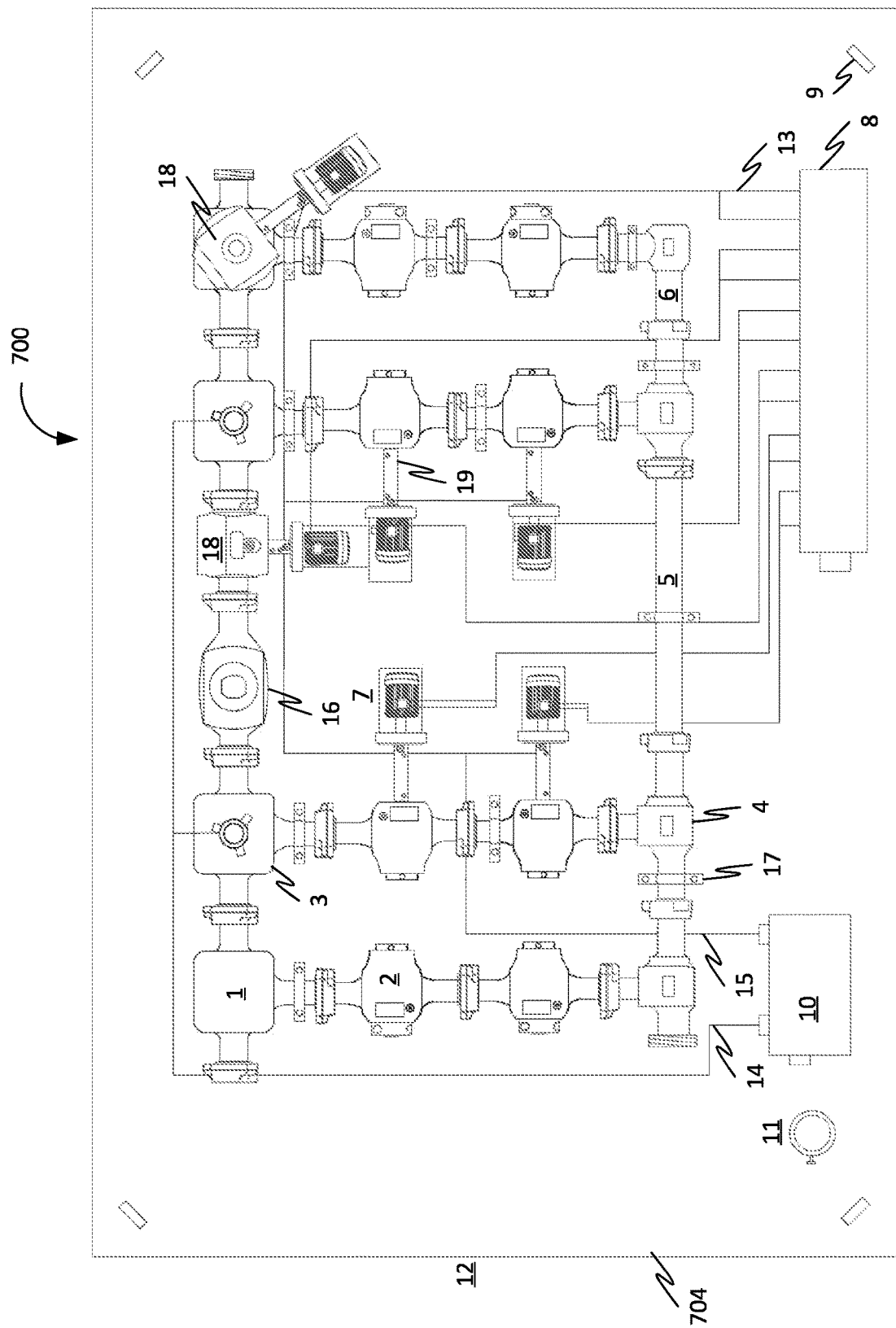
FIG. 7 is a schematic of an apparatus comprising an electric actuator, in accordance with exemplary embodiments.
Figure 8:
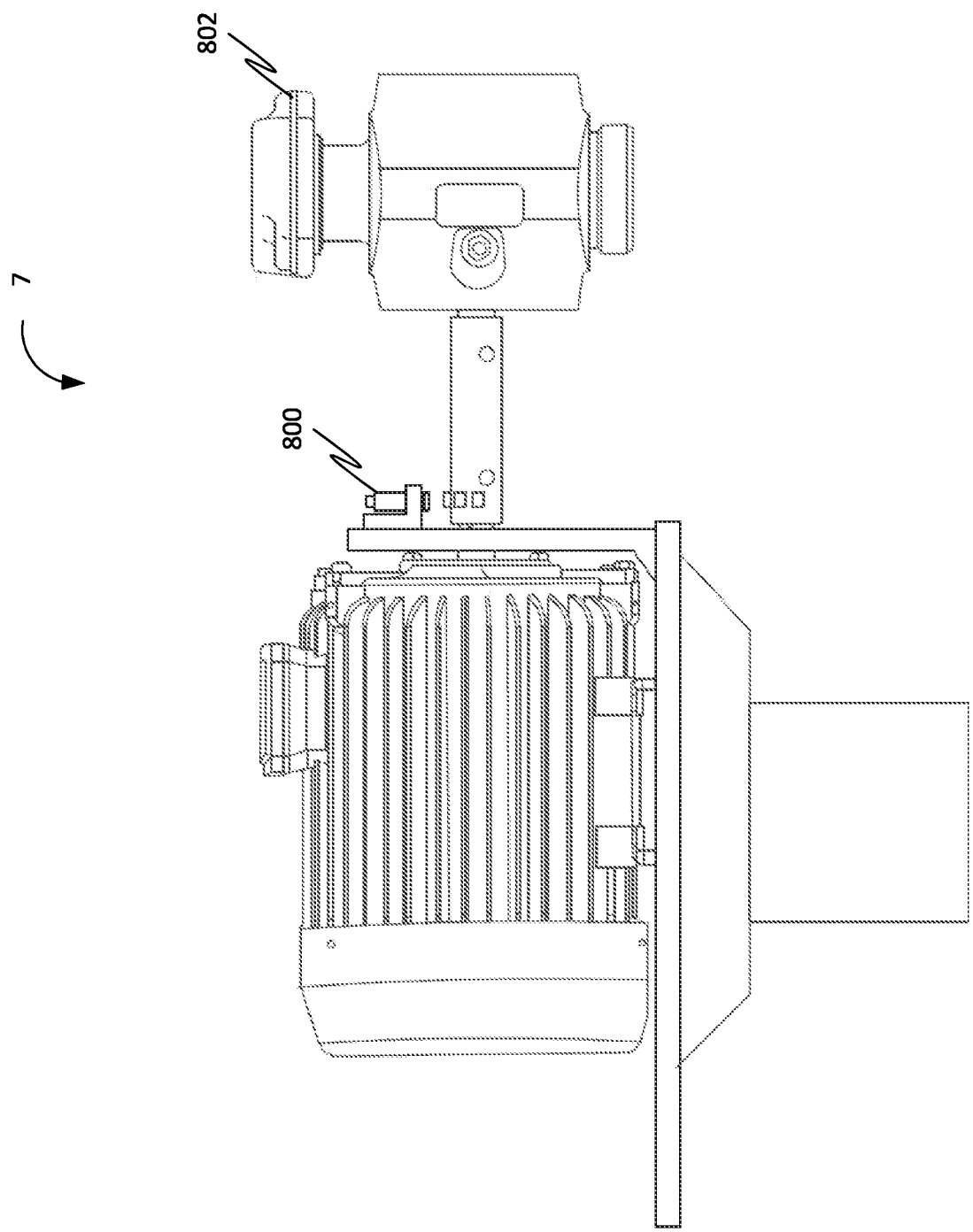
FIG. 8 is a side view of the electric actuator.
Figure 9:
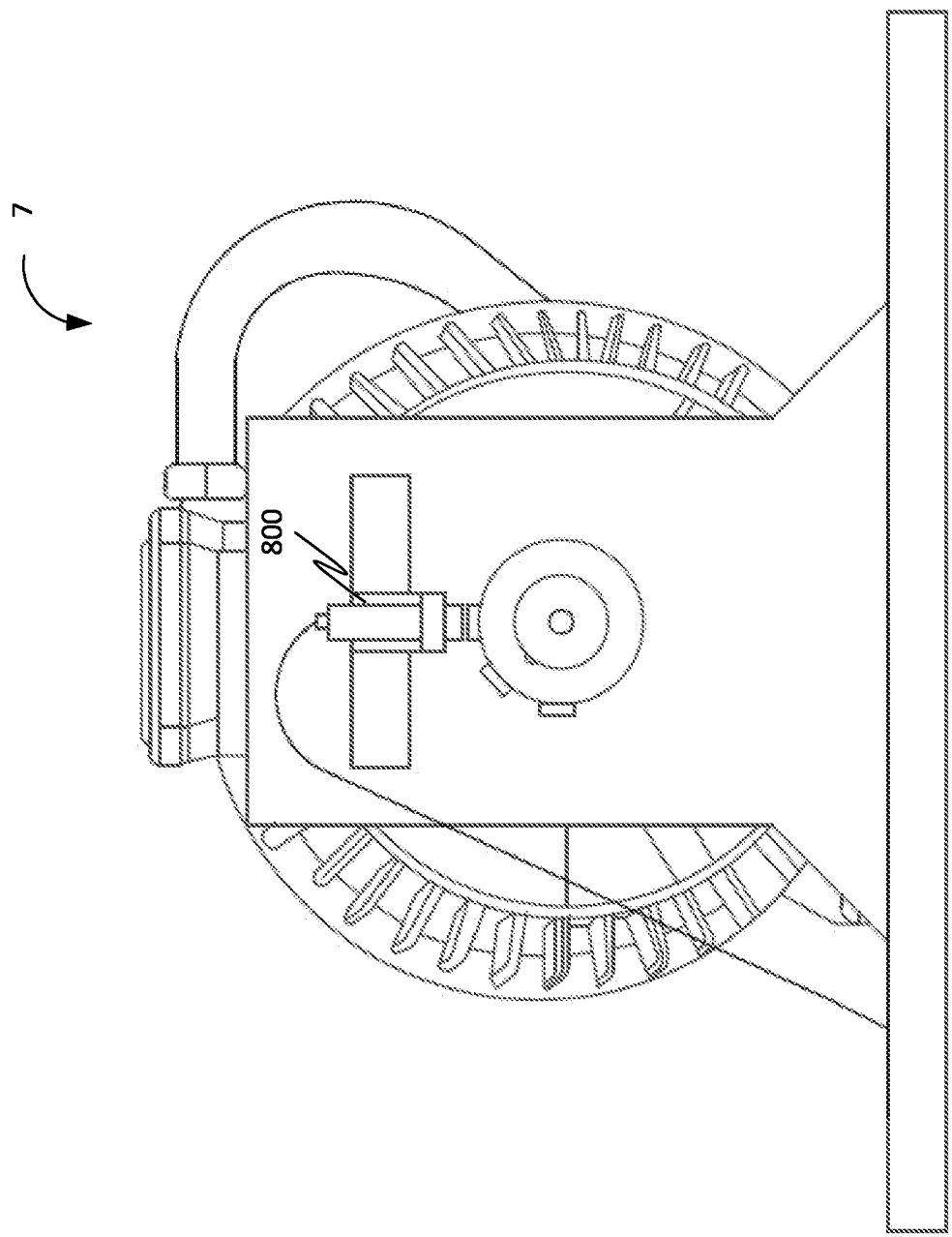
FIG. 9 is a front view of the electric actuator.

FIG. 7 is a schematic of an apparatus 700 comprising an electric actuator (7) (an electric motor), in accordance with exemplary embodiments. FIG. 8 is a side view of the electric actuator (7). FIG. 9 is a front view of the electric actuator (7).

The apparatus 700 may be configured for relieving pressure in a fluid transportation system. The fluid transportation system may include a fluid inlet configured to receive fluid, a fluid outlet configured to discharge fluid, a conduit fluidly coupled to each of the fluid inlet and the fluid outlet, a pressure gauge configured to indicate a pressure of the fluid in the conduit, and a pressure relieving valve 802 fluidly coupled to the conduit at a location along the conduit. Further, the pressure relieving valve 802 may be configured to relieve pressure in the conduit. Further, the pressure relieving valve 802 may include a valve body comprising a valve inlet fluidly coupled to the conduit, a valve cavity fluidly coupled to the valve inlet, a valve outlet fluidly coupled to the valve cavity, and a flow control member disposed in the valve cavity. Further, the flow control member may be configured to control flow of fluid from the valve inlet to the valve outlet. Further, the flow control member may be configured to be set at one of a plurality of positions in relation to the valve cavity. Further, the plurality of positions may include a fully open position, a partially open position and a fully closed position. Further, the flow control member further may include a handle configured to facilitate transitioning of the flow control member from a first position of the plurality of positions to a second position of the plurality of positions.

Further, the apparatus 700 may include the electric actuator (7) configured to be mounted onto the handle of the flow control member. Further, the electric actuator (7) may be configured to exert a force on the handle based on a command. Further, the apparatus 700 may include a valve sensor 800 configured to be attached to the pressure relieving valve 802. Further, the valve sensor 800 may be configured to detect a position of the flow control member and generate a valve position data representing the position based on the detection. Further, the apparatus 700 may include an image capturing device configured to capture an image of the pressure gauge. Further, the image capturing device may be configured to be mounted on the fluid transportation system. Further, the apparatus 700 may include a processing device communicatively coupled to the electric actuator (7), the valve sensor 800 and the image capturing device. Further, the apparatus 700 may include a storage device communicatively coupled to the processing device. Further, the storage device may be configured to store the predetermined limit. Further, the apparatus 700 may include a wireless transceiver communicatively coupled to the processing device. Further, the wireless transceiver may be configured to transmit at least one of the image, the valve position data and the command to a remote user device and receive a remote instruction from the remote user device. Further, the apparatus 700 may include a touchscreen display device communicatively coupled to the processing device.

Further, the apparatus 700 may include one or more of 3" API 6A Tee (1) with hammer and thread unions, 2" Weco ULT plug valves (2), API 6A (3) crosses with hammer and thread unions, 3" Tee (4) with weco thread unions, 4 ft 3" Pup Joint (5), 3" 90 degree elbow (6) with hammer and threaded union, Electric motor and mounting stand (7) with attached 1½ L-bracket that holds a metal head all metal sensing proximity sensor with IO-Link, 12 port electrical motor junction box with 12 power wires (8), Lifting anchors (9), Electrical junction box (10), Pole mount (11), Iron skid (12), Electrical motor power wires (13), Mating jupiter connector cables with 4 conductor silicone jackets, for viatran transmitters (14), M-12 sensor cables (15) female to straight connection, 3' weco top entry check valve (16), Iron pole mounted double bolted clamps (17), 3" ULT plug valve (18) without plug cap, and Iron shafts (19) with two set screws and three attached positioning notches.

Figure 10:
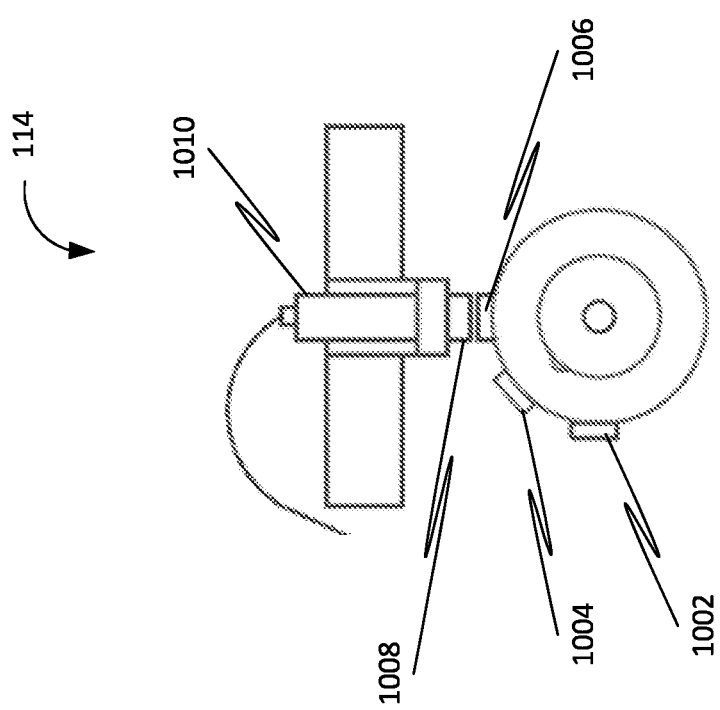
FIG. 10 is a front view of a valve sensor in accordance with some embodiments.

FIG. 10 is a front view of the valve sensor 114 in accordance with some embodiments. The valve sensor 114 may include a plurality of notches 1002-1006 radially disposed around the handle. Further, the plurality of notches 1002-1006 corresponds to the plurality of positions of the flow control member.

Further, the valve sensor 114 may include a proximity sensor 1008 disposed on at least one of an exterior surface of the valve body and a stationary part of the actuator 112. Further, the proximity sensor 1008 may be configured to detect proximity of a notch of the plurality of notches 1002-1006 to the proximity sensor. Further, the valve position data may be based on detection of the proximity.

Further, the valve sensor 114 may include a notch coupler configured to be mounted on a stem 1010 of the handle. Further, the plurality of notches 1002-1006 may be attached to an outer side of the notch coupler. Further, an inner side of the notch coupler is in contactable with the stem 1010. Further, the plurality of notches 1002-1006 may include three notches 1002-1006. Further, each notch may include an elongated member extending away from the outer side of the notch coupler.

According to further embodiments, the fluid transportation system may include a platform configured to provide a base for mounting one or more components of the fluid transportation system. A platform 204 is shown in FIGS. 2-4. A platform 404 is shown in FIG. 4. A platform 504 is shown in FIG. 5. A platform 704 is shown in FIG. 7.

Further, the fluid transportation system may include a manifold mounted on the platform. Further, the manifold may include an assembly of at least one pipe, at least one junction, at least one manually operated valve, at least one check valve and the pressure relieving valve 110.

In a specific embodiment, the at least one junction may include one or more of a 3" API 6A Tee with hammer and thread unions, API 6A crosses with hammer and thread unions, 3" Tee with weco thread unions, 4 ft 3" Pup Joint, 3" 90-degree elbow with hammer and threaded union.

According to further embodiments, the pressure relieving valve 110 may include a plurality of pressure relieving valves. Further, the actuator 112 may include a plurality of hydraulic actuators corresponding to the plurality of pressure relieving valves. Further, a hydraulic actuator may include an actuator connector. Further, the actuator 112 may include an actuator fluid reservoir may include an incompressible fluid.

Further, the actuator 112 may include a pump fluidly coupled to the actuator fluid reservoir. Further, the pump may be configured to pump the actuator fluid through a plurality of pump ports may include in the pump. Pumping of the fluid may include injecting the fluid into the interior space and/or sucking the fluid away from the interior space and back into the fluid reservoir.

Further, the actuator 112 may include a powered machine operationally coupled to the pump. Further, the powered machine may provide mechanical power to the pump based on at least one of electrical energy and fuel combustion.

Further, the actuator 112 may include a plurality of hoses configured to fluidly couple the plurality of hydraulic actuators to the plurality of pump ports. Further, each hose may be configured to transport fluid. Further, each hose may include a first hose connector configured to detachably couple with an actuator connector of a corresponding hydraulic actuator of the plurality of hydraulic actuators and a second hose connector configured to detachably couple with a port of the plurality of pump ports.

Further, each of the first hose connector and the second hose connector of each of the plurality of hoses may include a quick-connect connector.

Figure 11:
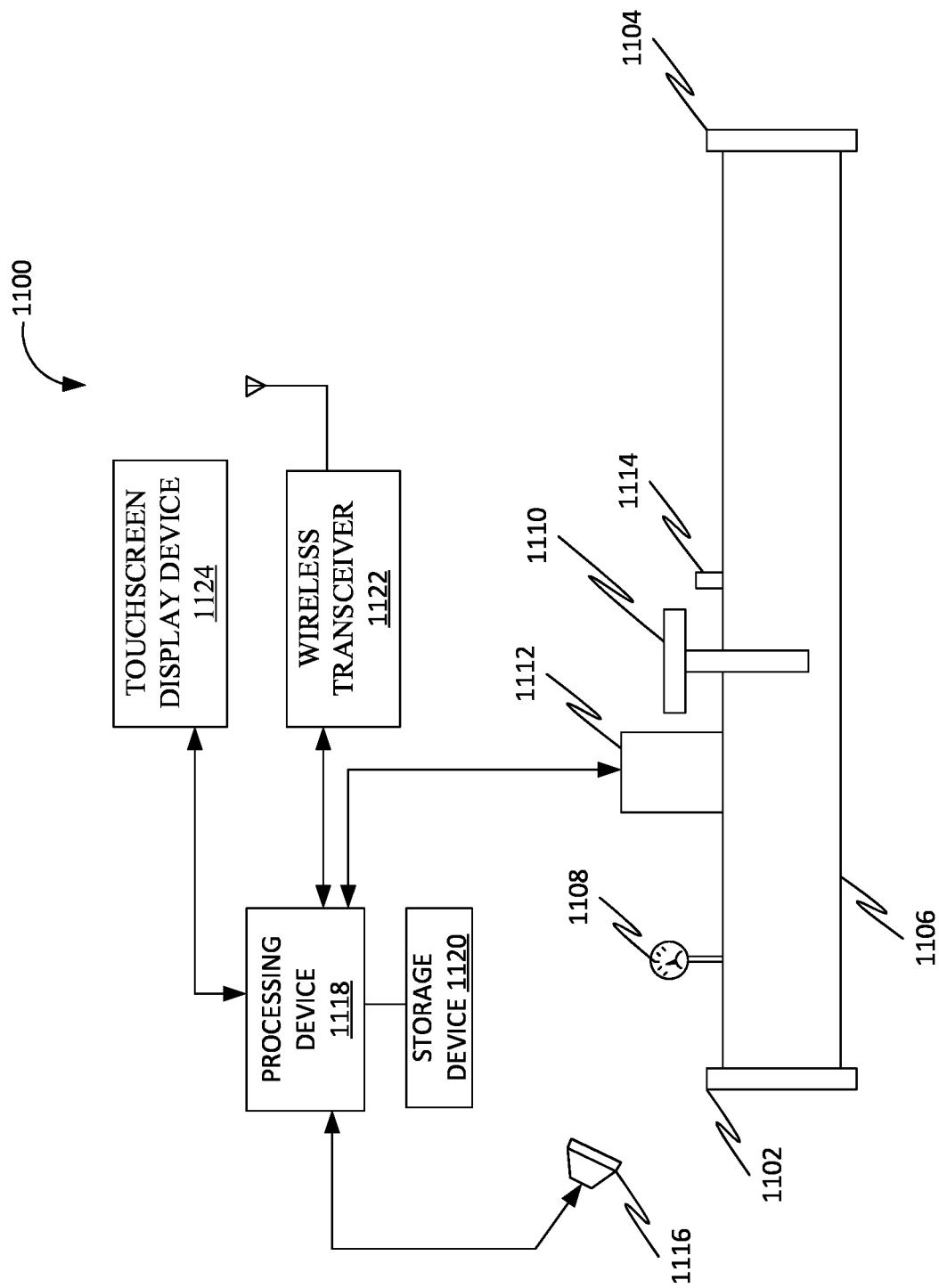
FIG. 11 is a schematic of a fluid transportation system configured for relieving pressure, in accordance with some embodiments.

FIG. 11 is a schematic of a fluid transportation system 1100 configured for relieving pressure, in accordance with some embodiments. Further, the fluid transportation system 1100 may include a fluid inlet 1102 configured to receive fluid. Further, the fluid transportation system 1100 may include a fluid outlet 1104 configured to discharge fluid.

Further, the fluid transportation system 1100 may include a conduit 1106 fluidly coupled to each of the fluid inlet 1102 and the fluid outlet 1104. Further, the conduit 1106 may be configured to transport the fluid from the fluid inlet 1102 to the fluid outlet 1104.

Further, the fluid transportation system 1100 may include a pressure gauge 1108 fluidly coupled to the conduit 1106. Further, the pressure gauge 1108 may be configured to indicate a pressure of the fluid in the conduit 1106.

Further, the fluid transportation system 1100 may include a pressure relieving valve 1110 fluidly coupled to the conduit 1106. Further, the pressure relieving valve 1110 may be configured to relieve pressure in the conduit 1106. Further, the pressure relieving valve 1110 may include a valve body may include a valve inlet fluidly coupled to the conduit 1106.

Further, the pressure relieving valve 1110 may include a valve cavity fluidly coupled to the valve inlet. Further, the pressure relieving valve 1110 may include a valve outlet fluidly coupled to the valve cavity. Further, the pressure relieving valve 1110 may include a flow control member disposed in the valve cavity. Further, the flow control member may be configured to control flow of fluid from the valve inlet to the valve outlet. Further, the flow control member may be configured to be set at one of a plurality of positions in relation to the valve cavity. Further, the plurality of positions may include an open position and a closed position. Further, the flow control member further may include a handle configured to facilitate transitioning of the flow control member from a first position of the plurality of positions to a second position of the plurality of positions.

Further, the fluid transportation system 1100 may include an actuator 1112 attached to the handle of the flow control member. Further, the actuator 1112 may be configured to exert a force on the handle based on a command.

In some embodiments, the actuator 1112 may include at least one of an electric actuator, a hydraulic actuator and a pneumatic actuator.

Further, the fluid transportation system 1100 may include a valve sensor 1114 attached to the pressure relieving valve 1110. Further, the valve sensor 1114 may be configured to detect a position of the flow control member and generate a valve position data representing the position.

Further, the fluid transportation system 1100 may include an image capturing device 1116 configured to capture an image of the pressure gauge 1108.

Further, the fluid transportation system 1100 may include a processing device 1118 communicatively coupled to the actuator 1112, the valve sensor 1114 and the image capturing device 1116. Further, the processing device 1118 may be configured to analyze the image. Further, the processing device 1118 may be configured to determine the pressure based on the analyzing. Further, the processing device 1118 may be configured to compare the pressure to a predetermined limit. Further, the processing device 1118 may be configured to generate the command based on the pressure exceeding the predetermined limit and the valve position data.

Further, the fluid transportation system 1100 may include a storage device 1120 communicatively coupled to the processing device 1118. Further, the storage device 1120 may be configured to store the predetermined limit.

Further, the fluid transportation system 1100 may include a wireless transceiver 1122 communicatively coupled to the processing device 1118. Further, the wireless transceiver 1122 may be configured to transmit at least one of the image, the valve position data and the command to a remote user device and receive a remote instruction from the remote user device. Further, the processing device 1118 may be configured to generate the command based on the remote instruction independent of the comparing.

Further, the fluid transportation system 1100 may include a touchscreen display device 1124 communicatively coupled to the processing device 1118. Further, the touchscreen display device 1124 may be configured to display at least one of the image, the pressure, the valve position data, the command and the remote instruction. Further, the touchscreen display device 1124 may be configured to receive a touch input corresponding to the pressure relieving valve 1110. Further, the processing device 1118 may be configured to generate the command based on the touch input independent of the pressure of the fluid in the conduit 1106.

Figure 12:
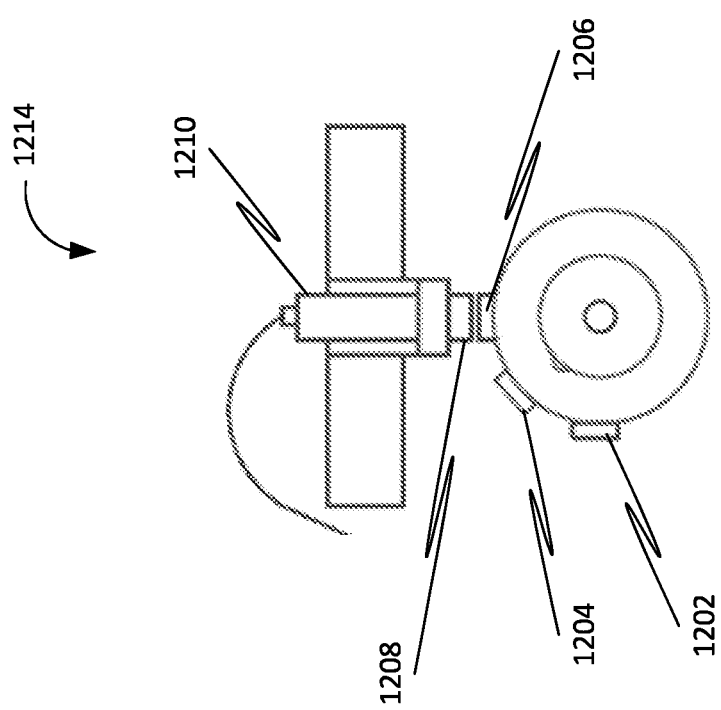
FIG. 12 is a front view of a valve sensor in accordance with some embodiments.

FIG. 12 is a front view of the valve sensor 1114 in accordance with some embodiments. Further, the valve sensor 1114 may include a plurality of notches 1202-1206 radially disposed around the handle. Further, the plurality of notches 1202-1206 corresponds to the plurality of positions of the flow control member.

Further, the valve sensor 1114 may include a proximity sensor 1208 disposed on at least one of an exterior surface of the valve body and a stationary part of the actuator 1112. Further, the proximity sensor 1208 may be configured to detect proximity of a notch of the plurality of notches 1202-1206 to the proximity sensor 1208. Further, the valve position data may be based on detection of the proximity.

Further, the valve sensor 1114 may include a notch coupler configured to be mounted on a stem 1210 of the handle. Further, the plurality of notches 1202-1206 may be attached to an outer side of the notch coupler. Further, an inner side of the notch coupler is in contactable with the stem 1210. Further, the plurality of notches 1202-1206 may include three notches 1202-1206. Further, each notch may include an elongated member extending away from the outer side of the notch coupler.

Figure 13:
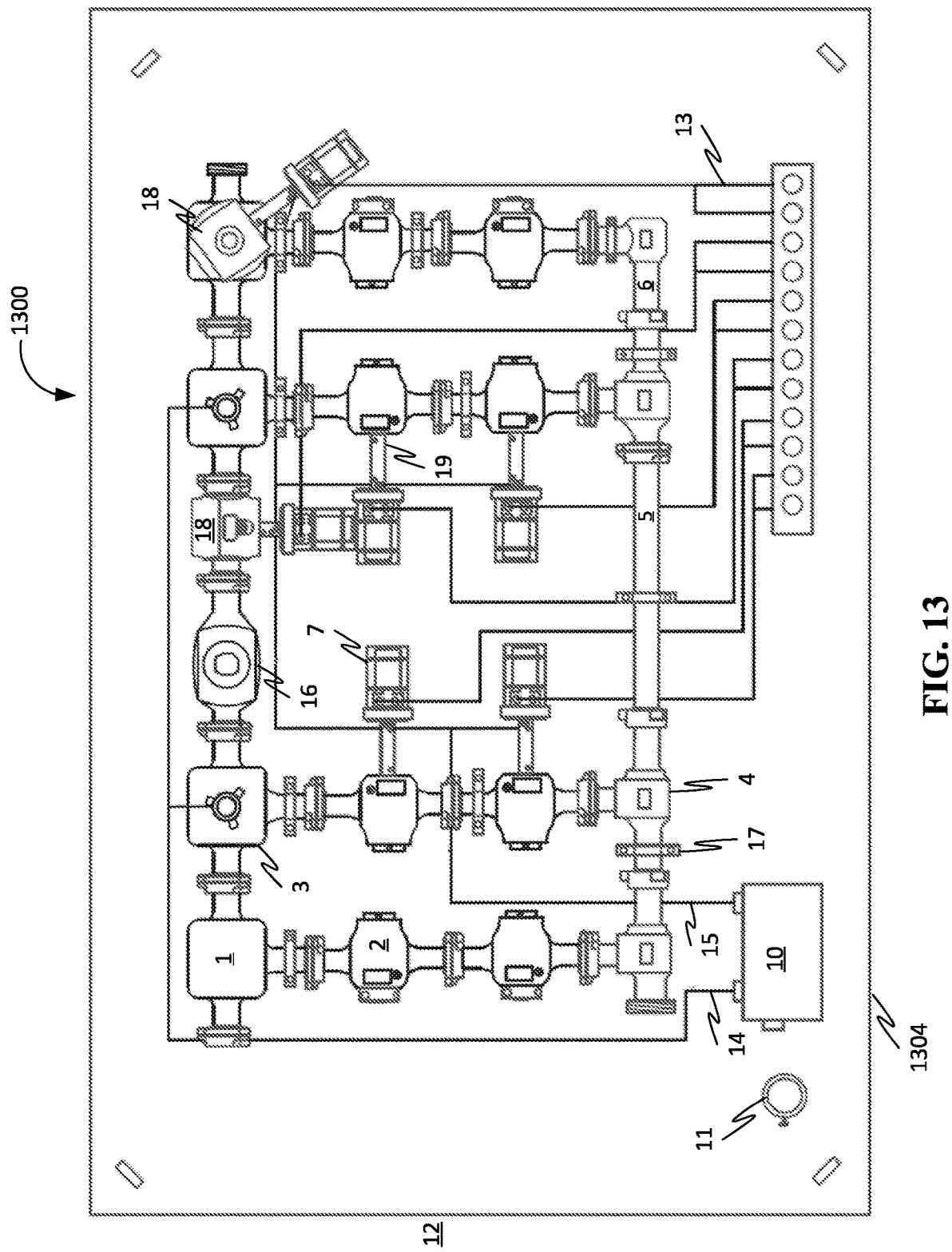
FIG. 13 is a schematic of a fluid transportation system comprising a hydraulic actuator, in accordance with exemplary embodiments.

According to some embodiments, the fluid transportation system 1100 may include a platform configured to provide a base for mounting one or more components of the fluid transportation system 1100. A platform 1304 is shown in FIG. 13.

Further, the fluid transportation system 1100 may include a manifold mounted on the platform. Further, the manifold may include an assembly of at least one pipe, at least one junction, at least one manually operated valve, at least one check valve and the pressure relieving valve 1110.

Further, the pressure relieving valve 1110 may include a plurality of pressure relieving valves. Further, the actuator 1112 may include a plurality of hydraulic actuators corresponding to the plurality of pressure relieving valves. Further, a hydraulic actuator may include an actuator connector. Further, the actuator 1112 may include an actuator fluid reservoir comprising an incompressible fluid. Further, the actuator 1112 may include a pump fluidly coupled to the actuator fluid reservoir. Further, the pump may be configured to pump the actuator fluid through a plurality of pump ports comprised in the pump.

Further, the actuator 1112 may include a powered machine operationally coupled to the pump. Further, the powered machine provides mechanical power to the pump based on at least one of electrical energy and fuel combustion.

Further, the actuator 1112 may include a plurality of hoses configured to fluidly couple the plurality of hydraulic actuators to the plurality of pump ports. Further, each hose may be configured to transport fluid. Further, each hose may include a first hose connector configured to detachably couple with an actuator connector of a corresponding hydraulic actuator of the plurality of hydraulic actuators and a second hose connector configured to detachably couple with a port of the plurality of pump ports.

In some embodiments, the fluid transportation system 1100 may include a pole mounted on the platform. Further, the pole may be configured to mount each of the image capturing device 1116 and the touchscreen display device 1124.

FIG. 13 is a schematic of a fluid transportation system 1300 comprising a hydraulic actuator (7), in accordance with exemplary embodiments. The fluid transportation system 1300 may be configured for relieving pressure.

Further, the fluid transportation system 1300 may include a fluid inlet configured to receive fluid. Further, the fluid transportation system 1300 may include a fluid outlet configured to discharge fluid. Further, the fluid transportation system 1300 may include a conduit fluidly coupled to each of the fluid inlet and the fluid outlet, wherein the conduit is configured to transport the fluid from the fluid inlet to the fluid outlet. Further, the fluid transportation system 1300 may include a pressure gauge fluidly coupled to the conduit, wherein the pressure gauge is configured to indicate a pressure of the fluid in the conduit. Further, the fluid transportation system 1300 may include a pressure relieving valve fluidly coupled to the conduit, wherein the pressure relieving valve is configured to relieve pressure in the conduit. Further, the pressure relieving valve may include a valve body comprising a valve inlet fluidly coupled to the conduit, a valve cavity fluidly coupled to the valve inlet, a valve outlet fluidly coupled to the valve cavity. Further, the pressure relieving valve may include a flow control member disposed in the valve cavity, wherein the flow control member is configured to control flow of fluid from the valve inlet to the valve outlet, wherein the flow control member is configured to be set at one of a plurality of positions in relation to the valve cavity, wherein the plurality of positions comprises a an open position and a closed position, wherein the flow control member further comprises a handle configured to facilitate transitioning of the flow control member from a first position of the plurality of positions to a second position of the plurality of positions.

Further, the fluid transportation system 1300 may include an actuator attached to the handle of the flow control member, wherein the actuator is configured to exert a force on the handle based on a command. Further, the fluid transportation system 1300 may include a valve sensor attached to the pressure relieving valve, wherein the valve sensor is configured to detect a position of the flow control member and generate a valve position data representing the position. Further, the fluid transportation system 1300 may include an image capturing device configured to capture an image of the pressure gauge. Further, the fluid transportation system 1300 may include a processing device communicatively coupled to the actuator, the valve sensor and the image capturing device. Further, the processing device may be configured to analyze the image, determine the pressure based on the analyzing, compare the pressure to a predetermined limit and generate the command based on the pressure exceeding the predetermined limit and the valve position data. Further, the fluid transportation system 1300 may include a storage device communicatively coupled to the processing device, wherein the storage device is configured to store the predetermined limit. Further, the fluid transportation system 1300 may include a wireless transceiver communicatively coupled to the processing device, wherein the wireless transceiver is configured to transmit at least one of the image, the valve position data and the command to a remote user device and receive a remote instruction from the remote user device, wherein the processing device is further configured to generate the command based on the remote instruction independent of the comparing; Further, the fluid transportation system 1300 may include a touchscreen display device communicatively coupled to the processing device. Further, the touchscreen display device may be configured to display at least one of the image, the pressure, the valve position data, the command and the remote instruction. Further, the touchscreen display device may be configured to receive a touch input corresponding to the pressure relieving valve, wherein the processing device is further configured to generate the command based on the touch input independent of the pressure of the fluid in the conduit.

Further, the fluid transportation system 1300 may include one or more of 3" API 6A Tee (1) with hammer and thread unions, 2" Weco ULT plug valves (2), API 6A (3) crosses with hammer and thread unions, 3" Tee (4) with weco thread unions, 4 ft 3" Pup Joint (5), 3" 90-degree elbow (6) with hammer and threaded union, hydraulic motor (7) and mount stands with 1½ inch bolted L-bracket and U-Bolts with mounted metal head all metal sensing proximity sensors with IO-Link, 12 port mounted bracket (8) for hydraulic hoses with quick disconnects, lifting anchors (9), electronic junction box (10), Pole mount (11), Iron skid (12) with 4 lifting anchors, High pressure Hydraulic hoses (13) with high flow male and female quick couplings, mating jupiter connector cables (14) with 4 conductor silicone jackets, for viatran transmitters, M12 sensor cable (15) female to straight connection, 3" Weco top entry check valve (16), Iron pole (17) mounted double bolted clamps, 3" ULT Plug Valves (18) without plug caps, Iron shafts (19) with two set screws and three attached positioning notches.

Figure 14:
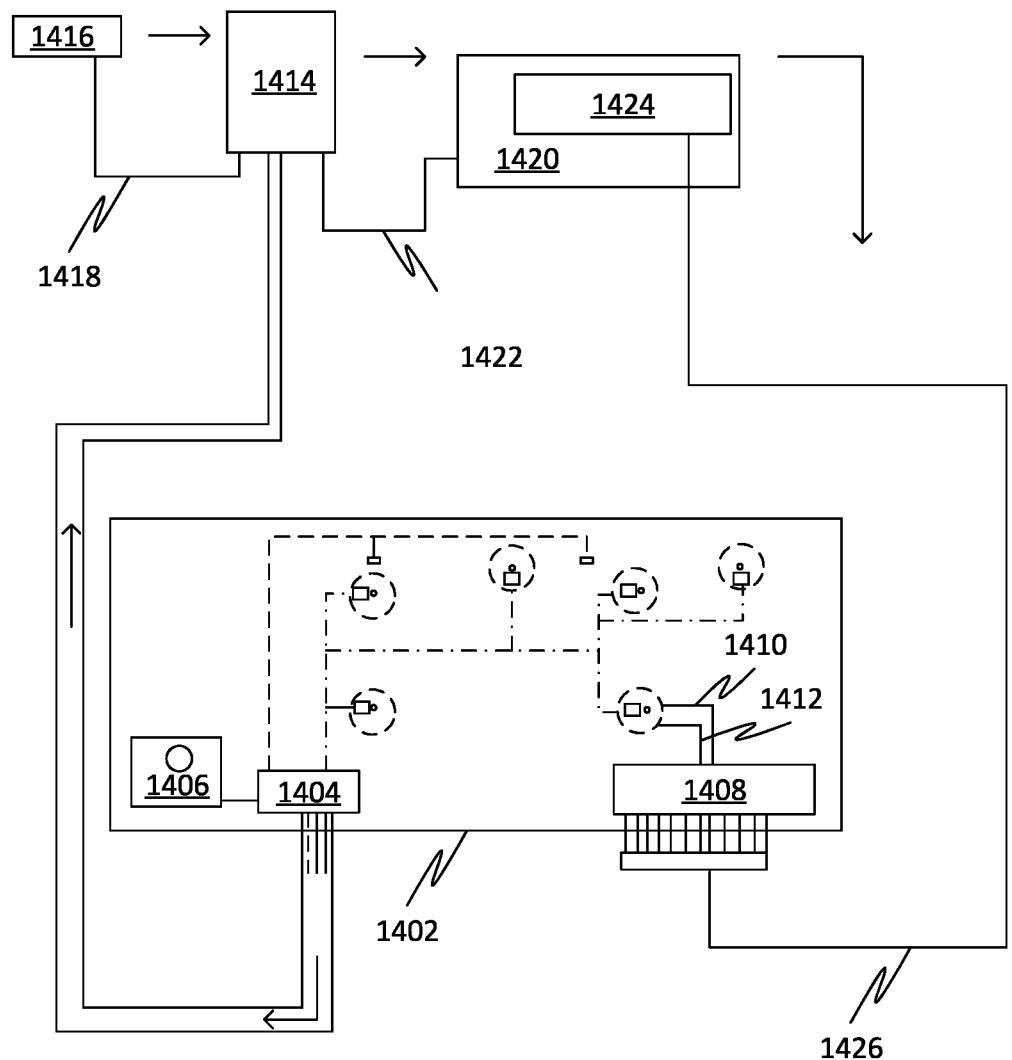
FIG. 14 is a schematic of an apparatus for relieving pressure in a fluid transportation system, in accordance with some embodiments.

FIG. 14 is a schematic of an apparatus 1400 for relieving pressure in a fluid transportation system, in accordance with some embodiments. The apparatus 1400 includes a platform 1402 and a manifold mounted on the platform 1402. The manifold may include a junction box 1404 for cable connections. The manifold may include camera and monitors 1406 connected to the junction box 1404. Further, the manifold may include high pressure hydraulic hoses connection ports 1408. Further, a supply line 1410 and a return line 1412 may be connected to the high pressure hydraulic hoses connection ports 1408.

Further, the manifold may include an assembly of at least one pipe, at least one junction, at least one manually operated valve, at least one check valve and a pressure relieving valve.

Further, the junction box 1404 is connected to a Data Acquisition Box 1414 with Automated PLC system and components that operates the Hydraulic Power Pack that controls the Hydraulic Valves also DVR camera setup and local HMI on the outside for local control. Further, a power cable may go to a 120/240-volt generator to supply power to the Data Acquisition Box 1414.

Further, a remote HMI 1416 may be configured to control the automated PLC system. The remote HMI 1416 may be connected to the Data Acquisition Box 1414 via an Ethernet cable 1418 box to control the automated PLC system.

Further, the Data Acquisition Box 1414 may be connected to a Hydraulic Power Pack 1420 with a control box that receives signal from the Automated PLC System which sends signal to the hydraulic directional valves and an electric motor which allows the system to pressurize and send hydraulic fluid to the selected hydraulic valve to either open or close depending what was selected on the SCADA program.

Further, the Data Acquisition Box 1414 may be connected to the Hydraulic Power Pack 1420 via a cable 1422 to control box on hydraulic power pack 1420.

Further, the Hydraulic Power Pack 1420 may include Directional Valves 1424 were hydraulic hoses connect.

Further, the high pressure hydraulic hoses connection ports 1408 may be connected to the Directional Valves 1424 via High pressure hydraulic lines 1426.

Once a Hydraulic Actuated Plug Valve is selected and the desired position that a user wants to open up to or close, then the hydraulic power pack is activated then the directional valve is activated to open or close and the motor activates as well. Then hydraulic fluid flows through the directional valve and make its way down the supply line that is associated with the desired valve and it turns the valve till the sensor is detected by one of the notches on the coupling that is mounted on the valve and then the signal that is mounted to the top of the valve sends signal back to the automated PLC system telling the hydraulic power pack to shut off. There are only the positions ¾ open, ½ way open and 100% open and the same for closing.

A legend 1434 is also shown in FIG. 14. The various components of the apparatus 1400 may be connected via pressure transducer cables 1428 and transducers that reads the pressure of fluid that's inside the pipes before its released s inside the pipes before its released or built up.

Further, the hydraulic Actuated Plug Valves 1430 with a custom mounted Proximity sensor mounted to the top as well a three notch position stem that allows the sensor to identify what state the Plug valve is in.

Further, individual proximity sensors 1432 may read the position of each Hydraulic Actuated Valves 1430 that its assigned to when it stops after being selected by operator, weather its being opened or closed.

Figure 15:
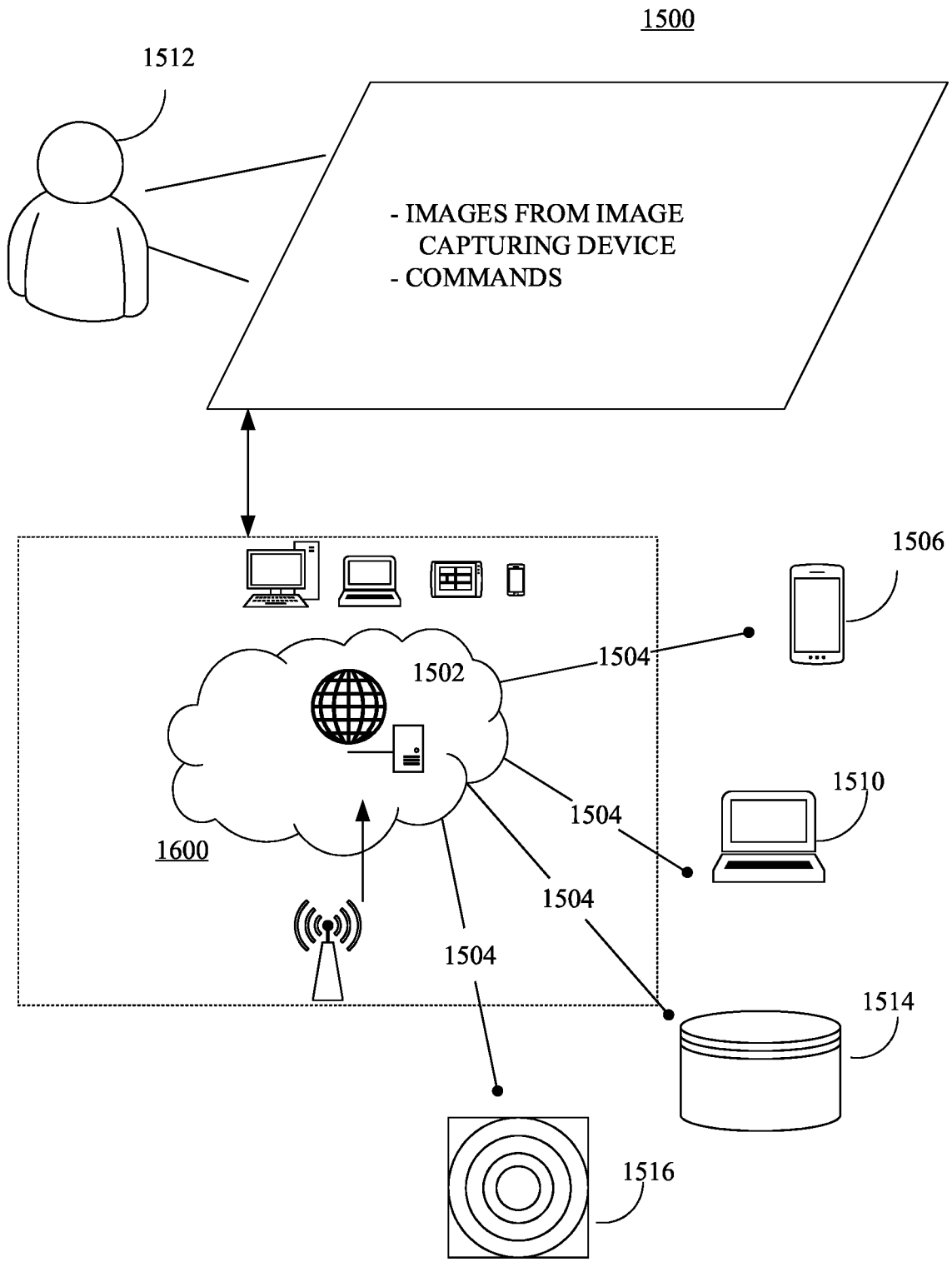
FIG. 15 is an illustration of an online platform consistent with various embodiments of the present disclosure.

FIG. 15 is an illustration of an online platform 1500 consistent with various embodiments of the present disclosure. By way of non-limiting example, the online platform 1500 to facilitate an apparatus for relieving pressure in a fluid transportation system may be hosted on a centralized server 1502, such as, for example, a cloud computing service. The centralized server 1502 may communicate with other network entities, such as, for example, a mobile device 1506 (such as a smartphone, a laptop, a tablet computer etc.), other electronic devices 1510 (such as desktop computers, server computers etc.), databases 1514, and sensors 1516 (such as the valve sensor over a communication network 1504, such as, but not limited to, the Internet. Further, users of the online platform 1500 may include relevant parties such as, but not limited to, operators, administrators, service providers, service consumers and so on. Accordingly, in some instances, electronic devices operated by the one or more relevant parties may be in communication with the platform.

A user 1512, such as the one or more relevant parties, may access online platform 1500 through a web based software application or browser. The web based software application may be embodied as, for example, but not be limited to, a website, a web application, a desktop application, and a mobile application compatible with a computing device 1600.

Figure 16:
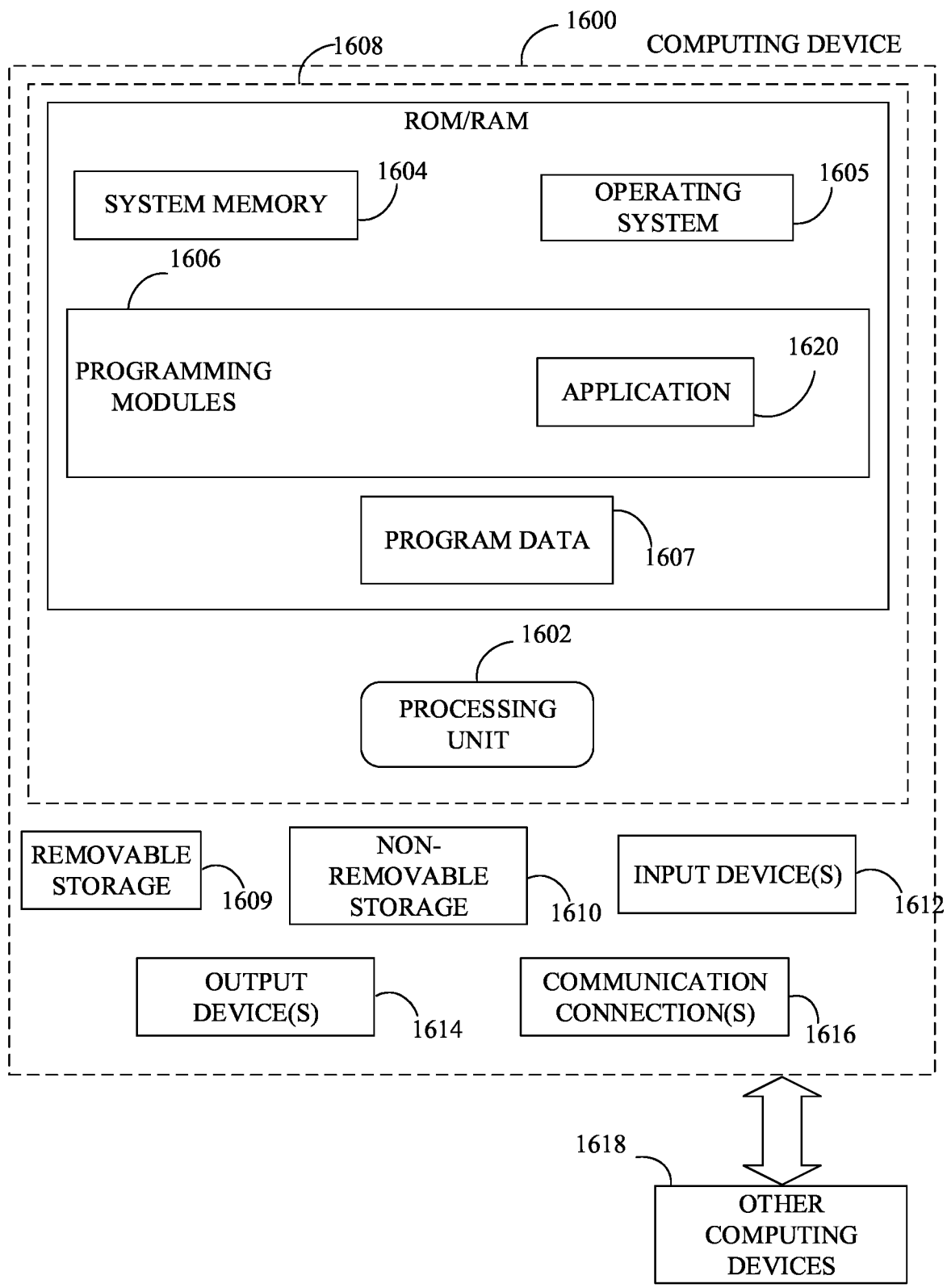
FIG. 16 is a block diagram of a computing device for implementing the methods disclosed herein, in accordance with some embodiments.

With reference to FIG. 16, a system consistent with an embodiment of the disclosure may include a computing device or cloud service, such as computing device 1600. In a basic configuration, computing device 1600 may include at least one processing unit 1602 and a system memory 1604. Depending on the configuration and type of computing device, system memory 1604 may comprise, but is not limited to, volatile (e.g. random-access memory (RAM)), non-volatile (e.g. read-only memory (ROM)), flash memory, or any combination. System memory 1604 may include operating system 1605, one or more programming modules 1606, and may include a program data 1607. Operating system 1605, for example, may be suitable for controlling computing device 1600's operation. In one embodiment, programming modules 1606 may include image-capturing module. Furthermore, embodiments of the disclosure may be practiced in conjunction with a graphics library, other operating systems, or any other application program and is not limited to any particular application or system. This basic configuration is illustrated in FIG. 16 by those components within a dashed line 1608.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 16 by a removable storage 1609 and a non-removable storage 1610. Computer storage media may include volatile and non-volatile, removable and non-removable media implemented in any method or technology for storage of information, such as computer-readable instructions, data structures, program modules, or other data. System memory 1604, removable storage 1609, and non-removable storage 1610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1600. Any such computer storage media may be part of device 1600. Computing device 1600 may also have input device(s) 1612 such as a keyboard, a mouse, a pen, a sound input device, a touch input device, a location sensor, a camera, a biometric sensor, etc. Output device(s) 1614 such as a display, speakers, a printer, etc. may also be included. The aforementioned devices are examples and others may be used.

Computing device 1600 may also contain a communication connection 1616 that may allow device 1600 to communicate with other computing devices 1618, such as over a network in a distributed computing environment, for example, an intranet or the Internet. Communication connection 1616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1604, including operating system 1605. While executing on processing unit 1602, programming modules 1606 (e.g., application 1620) may perform processes including, for example, one or more stages of methods, algorithms, systems, applications, servers, databases as described above. The aforementioned process is an example, and processing unit 1602 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. An apparatus for relieving pressure in a fluid transportation system, wherein the fluid transportation system comprises a fluid inlet configured to receive fluid, a fluid outlet configured to discharge fluid, a conduit fluidly coupled to each of the fluid inlet and the fluid outlet, wherein the conduit is configured to transport the fluid from the fluid inlet to the fluid outlet, a pressure gauge configured to indicate a pressure of the fluid in the conduit, and a pressure relieving valve fluidly coupled to the conduit at a location along the conduit, wherein the pressure relieving valve is configured to relieve pressure in the conduit, wherein the pressure relieving valve comprises a valve body comprising a valve inlet fluidly coupled to the conduit, a valve cavity fluidly coupled to the valve inlet, a valve outlet fluidly coupled to the valve cavity, and a flow control member disposed in the valve cavity, wherein the flow control member is configured to control flow of fluid from the valve inlet to the valve outlet, wherein the flow control member is configured to be set at one of a plurality of positions in relation to the valve cavity, wherein the plurality of positions comprises a fully open position, a partially open position and a fully closed position, wherein the flow control member further comprises a handle configured to facilitate transitioning of the flow control member from a first position of the plurality of positions to a second position of the plurality of positions, wherein the apparatus comprises:

an actuator configured to be mounted onto the handle of the flow control member, wherein the actuator is configured to exert a force on the handle based on a command;

a valve sensor configured to be attached to the pressure relieving valve, wherein the valve sensor is configured to detect a position of the flow control member and generate a valve position data representing the position based on the detection;

an image capturing device configured to capture an image of the pressure gauge, wherein the image capturing device is configured to be mounted on the fluid transportation system;

a processing device communicatively coupled to the actuator, the valve sensor and the image capturing device, wherein the processing device is configured to:
analyze the image;
determine the pressure based on the analyzing;
compare the pressure to a predetermined limit; and
generate the command based on the pressure exceeding the predetermined limit and the valve position data;

a storage device communicatively coupled to the processing device, wherein the storage device is configured to store the predetermined limit; and a wireless transceiver communicatively coupled to the processing device, wherein the wireless transceiver is configured to transmit at least one of the image, the valve position data and the command to a remote user device and receive a remote instruction from the remote user device, wherein the processing device is further configured to generate the command based on the remote instruction independent of the comparing; and a touchscreen display device communicatively coupled to the processing device, wherein the touchscreen display device is configured to:
display at least one of the image, the pressure, the valve position data, the command and the remote instruction; and
receive a touch input corresponding to the pressure relieving valve, wherein the processing device is further configured to generate the command based on the touch input independent of the pressure of the fluid in the conduit.

2. The apparatus of claim 1, wherein the actuator comprises a hydraulic actuator comprising:
an actuator fluid reservoir comprising an incompressible fluid;
a pump fluidly coupled to the actuator fluid reservoir, wherein the pump is configured to pump the actuator fluid;
a powered machine operationally coupled to the pump, wherein the powered machine provides mechanical power to the pump based on at least one of electrical energy and fuel combustion;
a cylindrical body comprising a first end cap and a second end cap and an interior space formed therebetween, wherein the cylindrical body is fluidly coupled to the pump;
a piston disposed within the interior space, wherein the piston is displaceable along a length of the interior space based on the actuator fluid being pumped into a portion of the interior space between an end cap and a side of the piston, wherein the end cap is at least one of the first end cap and the second end cap; and
a piston rod connected to the piston, wherein the piston rod is operationally coupled to the handle.

3. The apparatus of claim 2, wherein the flow control member is configured to be set at one of the plurality of positions based on a rotatory movement of the handle, wherein the hydraulic actuator further comprises a rack and pinion gear operatively coupled to each of the piston rod and the handle, wherein the rack and pinion gear is configured to convert a translatory movement of the piston rod into the rotatory movement of the handle.

4. The apparatus of claim 1, wherein the actuator comprises a pneumatic actuator comprising:
an air compressor configured to pump air;
a powered machine operationally coupled to the air compressor, wherein the powered machine provides mechanical power to the air compressor based on at least one of electrical energy and fuel combustion;
a cylindrical body fluidly coupled to the air compressor, wherein the cylindrical body comprises a first end cap and a second end cap and an interior space formed therebetween;
a piston disposed within the interior space, wherein the piston is displaceable along a length of the interior space based on air pressure in a portion of the interior space between an end cap and a side of the piston, wherein the end cap is at least one of the first end cap and the second end cap; and
a piston rod connected to the piston, wherein the piston rod is operationally coupled to the handle.

5. The apparatus of claim 4, wherein the flow control member is configured to be set at one of the plurality of positions based on a rotatory movement of the handle, wherein the pneumatic actuator further comprises a rack and pinion gear operatively coupled to each of the piston rod and the handle, wherein the rack and pinion gear is configured to convert a translatory movement of the piston rod into the rotatory movement of the handle.

6. The apparatus of claim 1, wherein the actuator comprises an electric actuator comprising an electric motor configured to generate rotatory motion on a shaft comprised in the electric motor, wherein the shaft is operationally coupled to the handle.

7. The apparatus of claim 1, wherein the actuator is configured to allow free movement of the handle based on a manually applied force to the handle independent of the command.

8. The apparatus of claim 1, wherein the valve sensor comprises:
a plurality of notches radially disposed around the handle, wherein the plurality of notches corresponds to the plurality of positions of the flow control member; and
a proximity sensor disposed on at least one of an exterior surface of the valve body and a stationary part of the actuator, wherein the proximity sensor is configured to detect proximity of a notch of the plurality of notches to the proximity sensor, wherein the valve position data is based on detection of the proximity.

9. The apparatus of claim 8, wherein the valve sensor comprises a notch coupler configured to be mounted on a stem of the handle, wherein the plurality of notches is attached to an outer side of the notch coupler, wherein an inner side of the notch coupler is in contactable with the stem, wherein the plurality of notches comprises three notches, wherein each notch comprises an elongated member extending away from the outer side of the notch coupler.

10. The apparatus of claim 1, wherein the pressure relieving valve comprises a plug valve.

11. The apparatus of claim 1, wherein the fluid transportation system comprises:
a platform configured to provide a base for mounting one or more components of the fluid transportation system; and
a manifold mounted on the platform, wherein the manifold comprises an assembly of at least one pipe, at least one junction, at least one manually operated valve, at least one check valve and the pressure relieving valve.

12. The apparatus of claim 1, wherein the pressure relieving valve comprises a plurality of pressure relieving valves, wherein the actuator comprises a plurality of hydraulic actuators corresponding to the plurality of pressure relieving valves, a hydraulic actuator comprises an actuator connector, wherein the actuator further comprises:
   an actuator fluid reservoir comprising an incompressible fluid;
   a pump fluidly coupled to the actuator fluid reservoir, wherein the pump is configured to pump the actuator fluid through a plurality of pump ports comprised in the pump;
   a powered machine operationally coupled to the pump, wherein the powered machine provides mechanical power to the pump based on at least one of electrical energy and fuel combustion; and
   a plurality of hoses configured to fluidly couple the plurality of hydraulic actuators to the plurality of pump ports, wherein each hose is configured to transport fluid, wherein each hose comprises a first hose connector configured to detachably couple with an actuator connector of a corresponding hydraulic actuator of the plurality of hydraulic actuators and a second hose connector configured to detachably couple with a port of the plurality of pump ports.

13. The apparatus of claim 12, wherein each of the first hose connector and the second hose connector of each of the plurality of hoses comprises a quick-connect connector.

14. A fluid transportation system configured for relieving pressure, wherein the fluid transportation system comprises:
   a fluid inlet configured to receive fluid;
   a fluid outlet configured to discharge fluid;
   a conduit fluidly coupled to each of the fluid inlet and the fluid outlet, wherein the conduit is configured to transport the fluid from the fluid inlet to the fluid outlet;
   a pressure gauge fluidly coupled to the conduit, wherein the pressure gauge is configured to indicate a pressure of the fluid in the conduit;
   a pressure relieving valve fluidly coupled to the conduit, wherein the pressure relieving valve is configured to relieve pressure in the conduit, wherein the pressure relieving valve comprises:
   a valve body comprising a valve inlet fluidly coupled to the conduit;
   a valve cavity fluidly coupled to the valve inlet;
   a valve outlet fluidly coupled to the valve cavity; and
   a flow control member disposed in the valve cavity, wherein the flow control member is configured to control flow of fluid from the valve inlet to the valve outlet, wherein the flow control member is configured to be set at one of a plurality of positions in relation to the valve cavity, wherein the plurality of positions comprises a an open position and a closed position, wherein the flow control member further comprises a handle configured to facilitate transitioning of the flow control member from a first position of the plurality of positions to a second position of the plurality of positions;
   an actuator attached to the handle of the flow control member, wherein the actuator is configured to exert a force on the handle based on a command;
   a valve sensor attached to the pressure relieving valve, wherein the valve sensor is configured to detect a position of the flow control member and generate a valve position data representing the position;
   an image capturing device configured to capture an image of the pressure gauge;
   a processing device communicatively coupled to the actuator, the valve sensor and the image capturing device, wherein the processing device is configured to:
      analyze the image;
      determine the pressure based on the analyzing;
      compare the pressure to a predetermined limit; and
      generate the command based on the pressure exceeding the predetermined limit and the valve position data;
   a storage device communicatively coupled to the processing device, wherein the storage device is configured to store the predetermined limit; and
   a wireless transceiver communicatively coupled to the processing device, wherein the wireless transceiver is configured to transmit at least one of the image, the valve position data and the command to a remote user device and receive a remote instruction from the remote user device, wherein the processing device is further configured to generate the command based on the remote instruction independent of the comparing; and
   a touchscreen display device communicatively coupled to the processing device, wherein the touchscreen display device is configured to:
      display at least one of the image, the pressure, the valve position data, the command and the remote instruction; and
      receive a touch input corresponding to the pressure relieving valve, wherein the processing device is further configured to generate the command based on the touch input independent of the pressure of the fluid in the conduit.

15. The fluid transportation system of claim 14, wherein the valve sensor comprises:
   a plurality of notches radially disposed around the handle, wherein the plurality of notches corresponds to the plurality of positions of the flow control member; and
   a proximity sensor disposed on at least one of an exterior surface of the valve body and a stationary part of the actuator, wherein the proximity sensor is configured to detect proximity of a notch of the plurality of notches to the proximity sensor, wherein the valve position data is based on detection of the proximity.

16. The fluid transportation system of claim 15, wherein the valve sensor comprises a notch coupler configured to be mounted on a stem of the handle, wherein the plurality of notches is attached to an outer side of the notch coupler, wherein an inner side of the notch coupler is in contactable with the stem, wherein the plurality of notches comprises three notches, wherein each notch comprises an elongated member extending away from the outer side of the notch coupler.

17. The fluid transportation system of claim 14 further comprising:
   a platform configured to provide a base for mounting one or more components of the fluid transportation system; and
   a manifold mounted on the platform, wherein the manifold comprises an assembly of at least one pipe, at least one junction, at least one manually operated valve, at least one check valve and the pressure relieving valve.

18. The fluid transportation system of claim 17, wherein the pressure relieving valve comprises a plurality of pressure relieving valves, wherein the actuator comprises a plurality of hydraulic actuators corresponding to the plurality of pressure relieving valves, wherein a hydraulic actuator comprises an actuator connector, wherein the actuator further comprises:
- an actuator fluid reservoir comprising an incompressible fluid;
- a pump fluidly coupled to the actuator fluid reservoir, wherein the pump is configured to pump the actuator fluid through a plurality of pump ports comprised in the pump;
- a powered machine operationally coupled to the pump, wherein the powered machine provides mechanical power to the pump based on at least one of electrical energy and fuel combustion; and
- a plurality of hoses configured to fluidly couple the plurality of hydraulic actuators to the plurality of pump ports, wherein each hose is configured to transport fluid, wherein each hose comprises a first hose connector configured to detachably couple with an actuator connector of a corresponding hydraulic actuator of the plurality of hydraulic actuators and a second hose connector configured to detachably couple with a port of the plurality of pump ports.

19. The fluid transportation system of claim 17, further comprising a pole mounted on the platform, wherein the pole is configured to mount each of the image capturing device and the touchscreen display device.

20. The fluid transportation system of claim 14, wherein the actuator comprises at least one of an electric actuator, a hydraulic actuator and a pneumatic actuator.

* * * * *